Aug. 1, 1944.    E. G. WEILER    2,354,896
COIN CONTROLLED VENDING APPARATUS
Filed Oct. 28, 1939    12 Sheets-Sheet 1
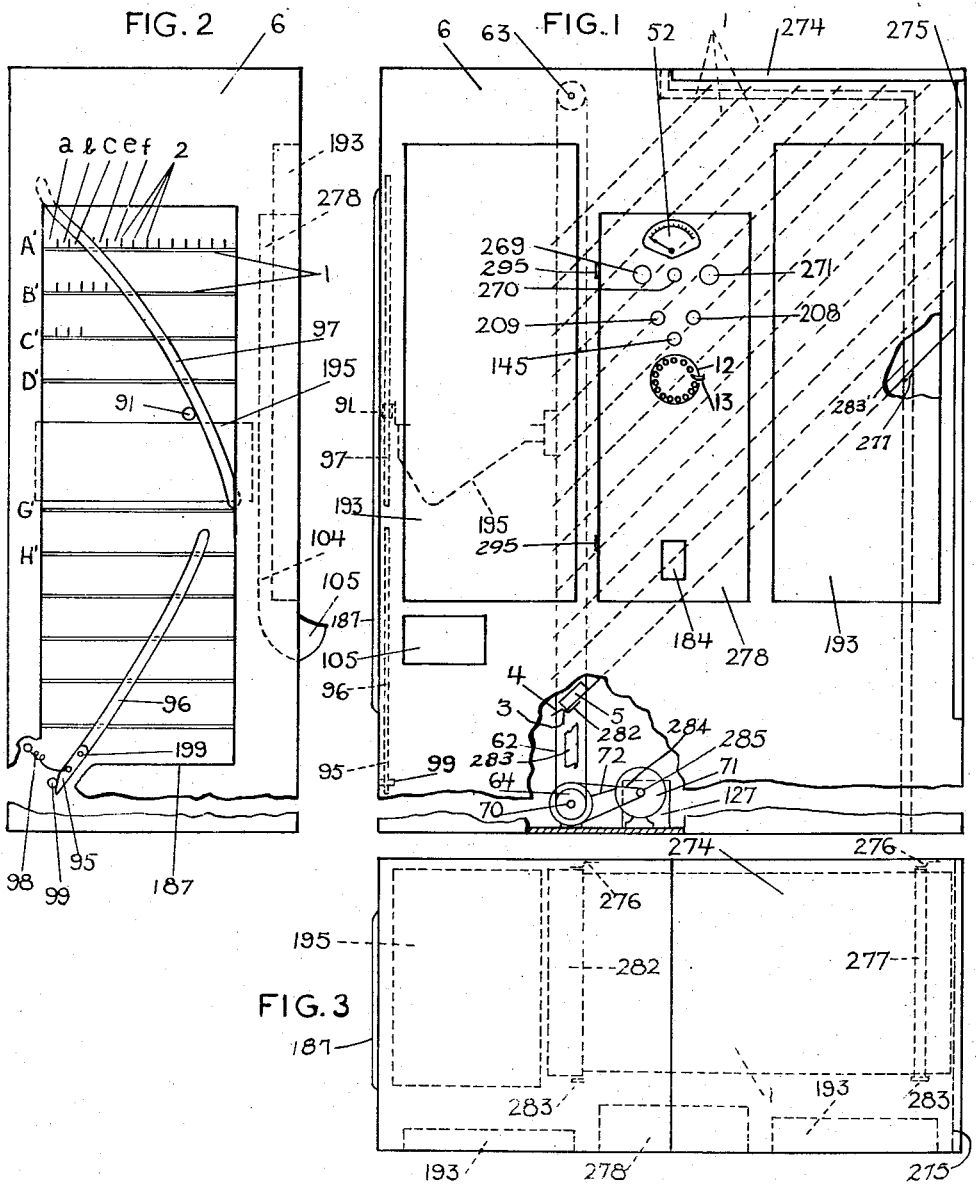
INVENTOR.
BY Edward G. Weiler
H. B. Babcock
ATTORNEY.

Aug. 1, 1944.  E. G. WEILER  2,354,896
COIN CONTROLLED VENDING APPARATUS
Filed Oct. 28, 1939  12 Sheets-Sheet 2

INVENTOR.
Edward G. Weiler
BY
H. S. Babcock
ATTORNEY.

Aug. 1, 1944.  E. G. WEILER  2,354,896
COIN CONTROLLED VENDING APPARATUS
Filed Oct. 28, 1939   12 Sheets-Sheet 3

INVENTOR.
Edward G. Weiler
BY  H. A. Babcock
ATTORNEY.

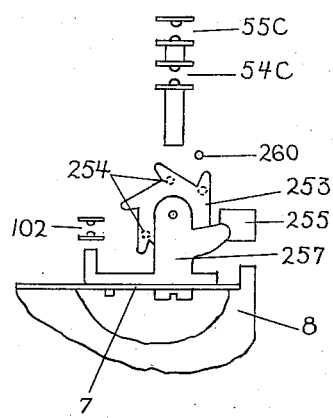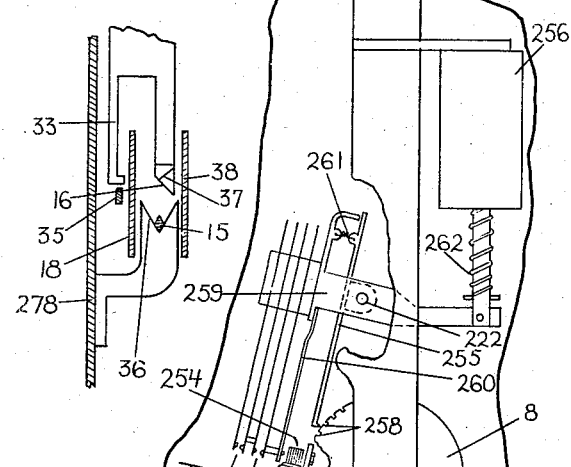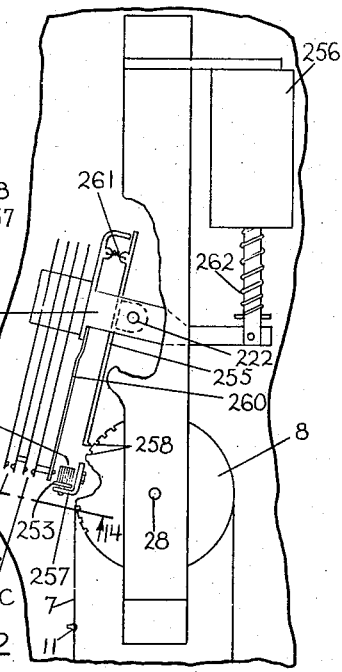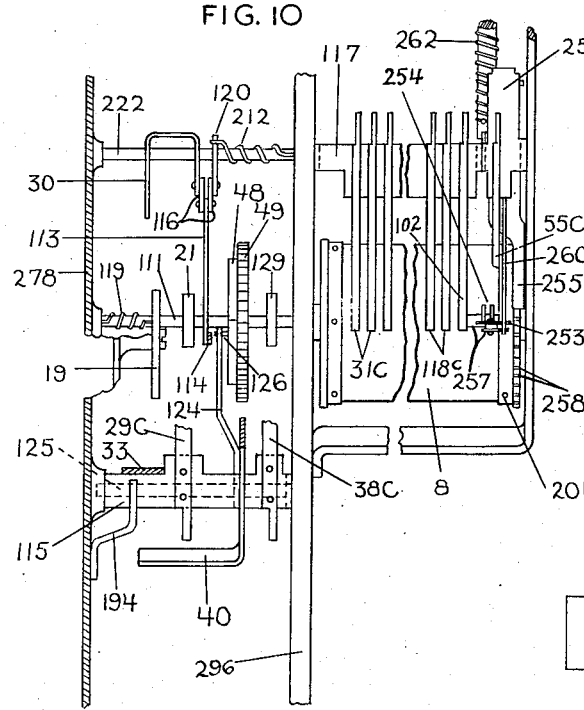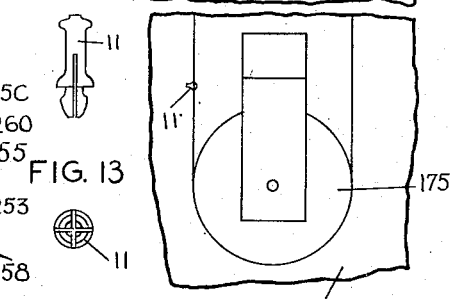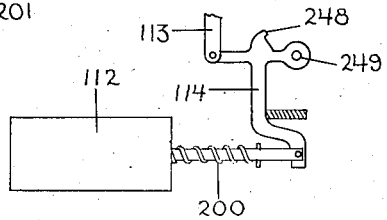

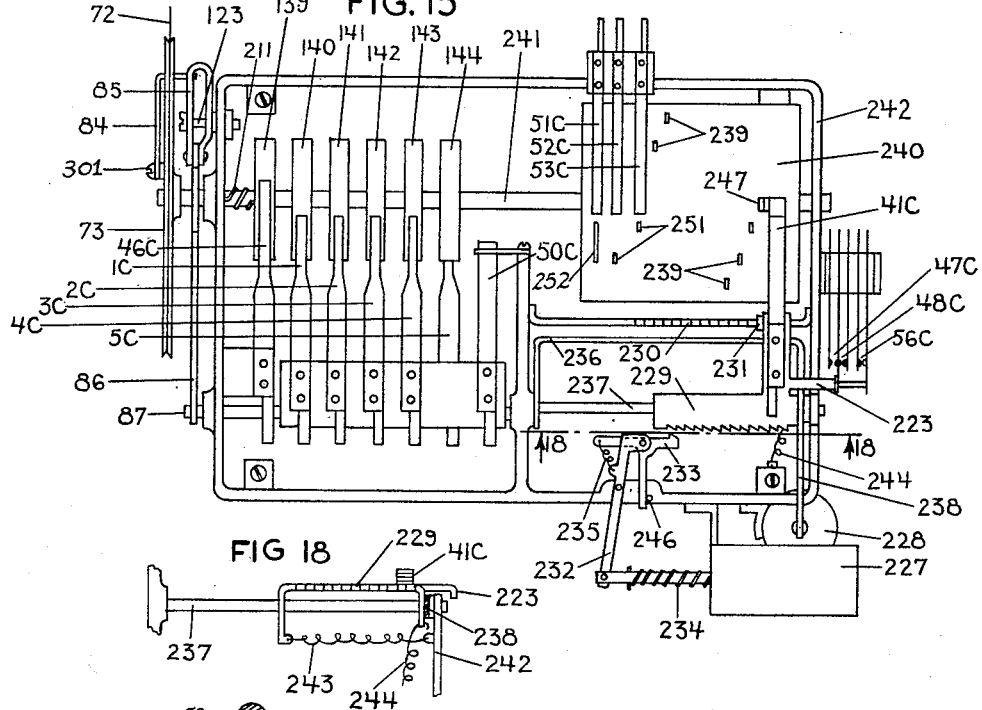
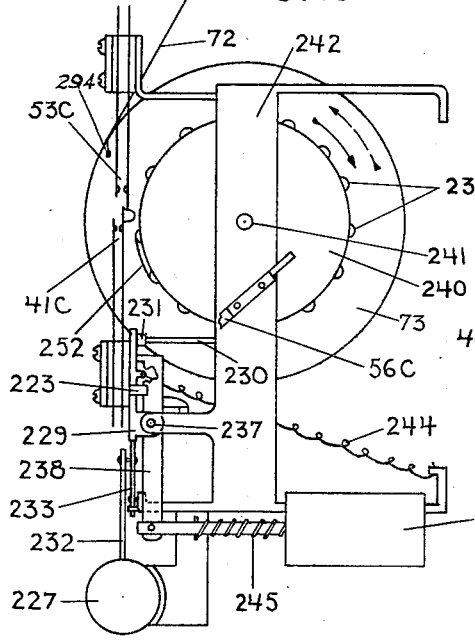
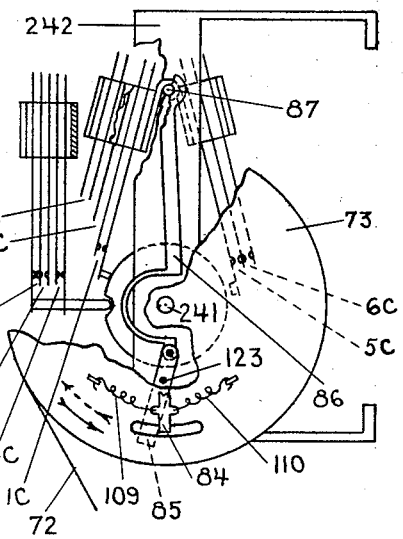

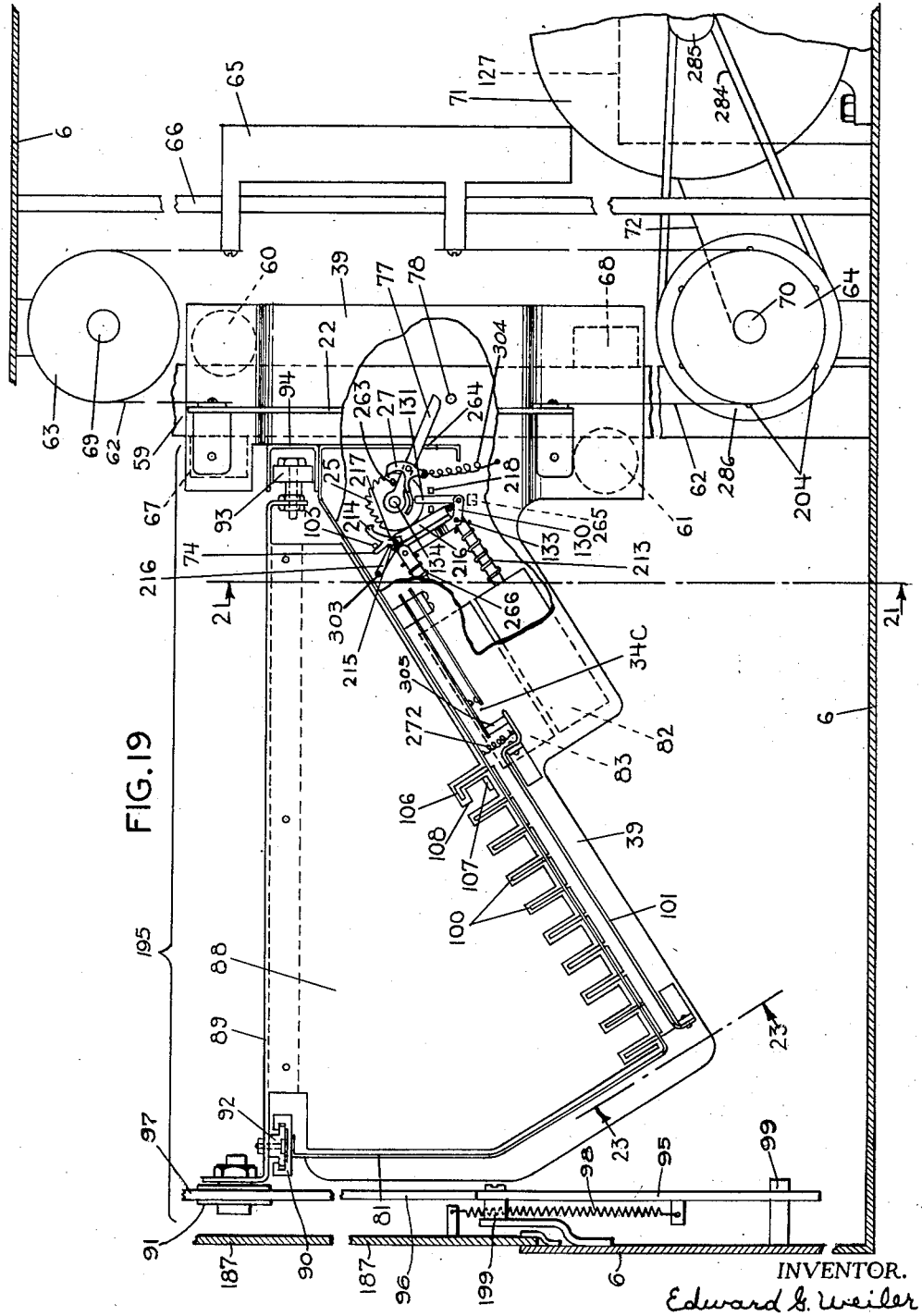

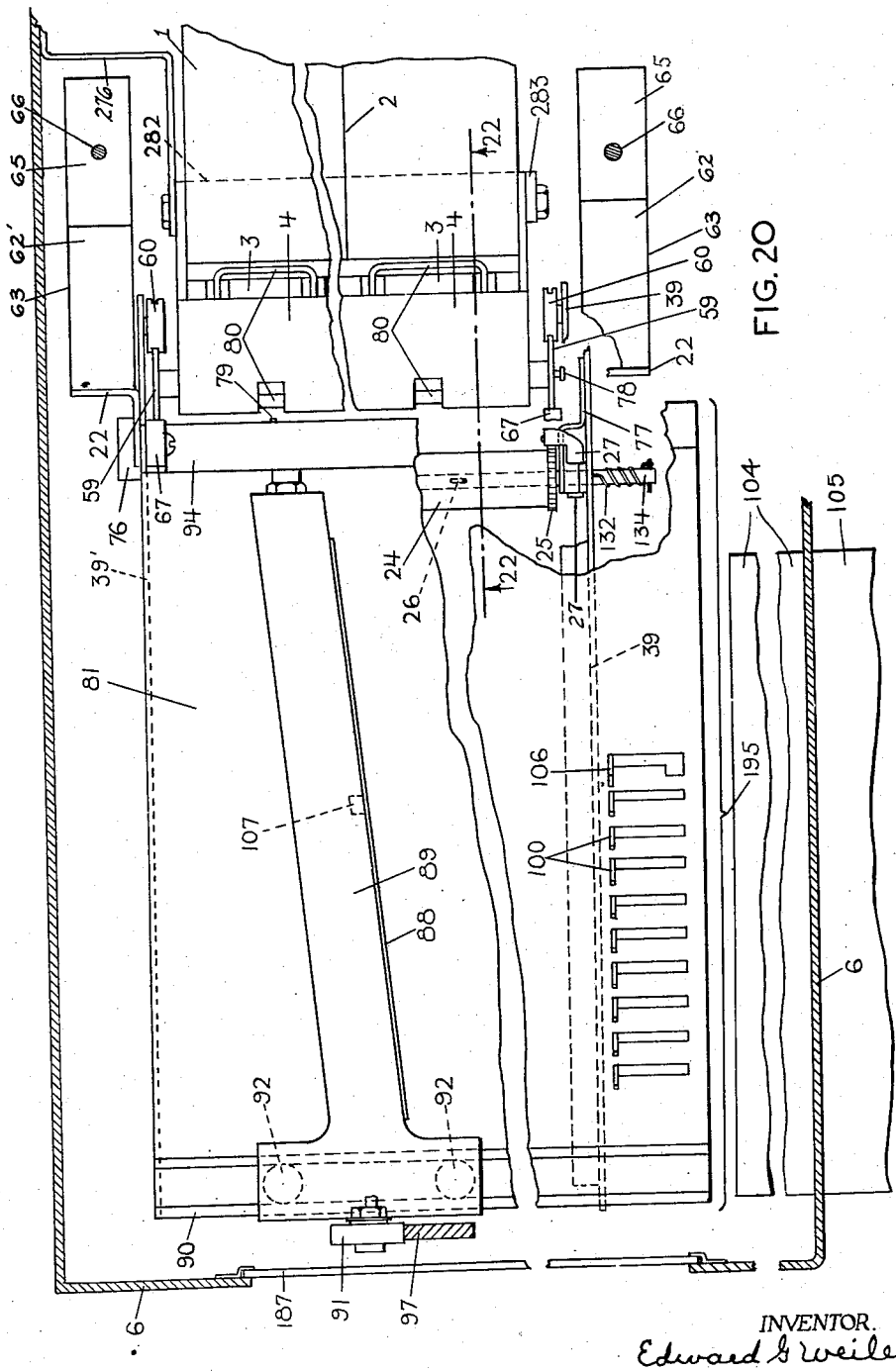

Aug. 1, 1944.   E. G. WEILER   2,354,896
COIN CONTROLLED VENDING APPARATUS
Filed Oct. 28, 1939   12 Sheets-Sheet 8

INVENTOR.
Edward G. Weiler
BY
H. A. Babcock
ATTORNEY.

Aug. 1, 1944.　　　　E. G. WEILER　　　　2,354,896
COIN CONTROLLED VENDING APPARATUS
Filed Oct. 28, 1939　　　12 Sheets-Sheet 9

INVENTOR.
Edward G. Weiler
BY H. F. Babcock
ATTORNEY.

Aug. 1, 1944. E. G. WEILER 2,354,896
COIN CONTROLLED VENDING APPARATUS
Filed Oct. 28, 1939 12 Sheets-Sheet 10
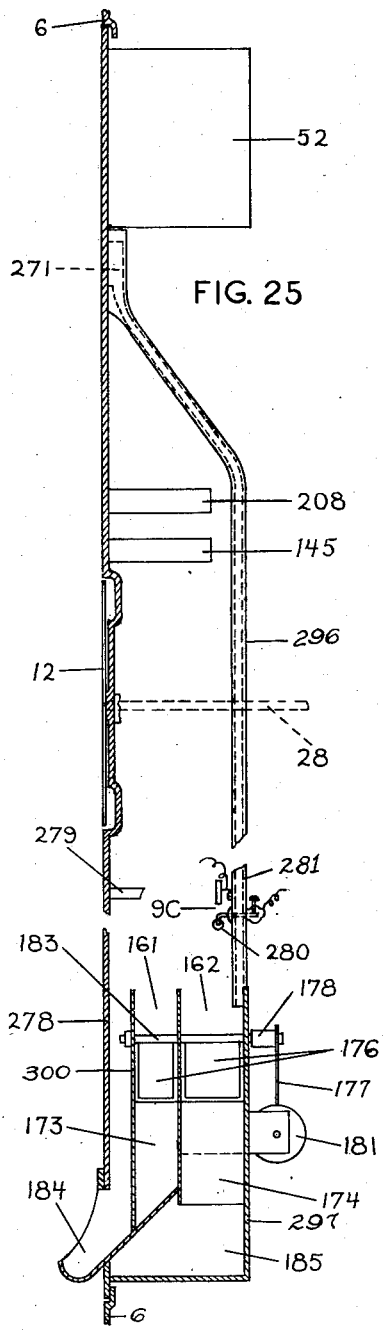
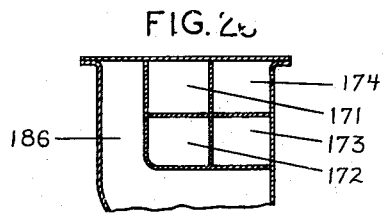
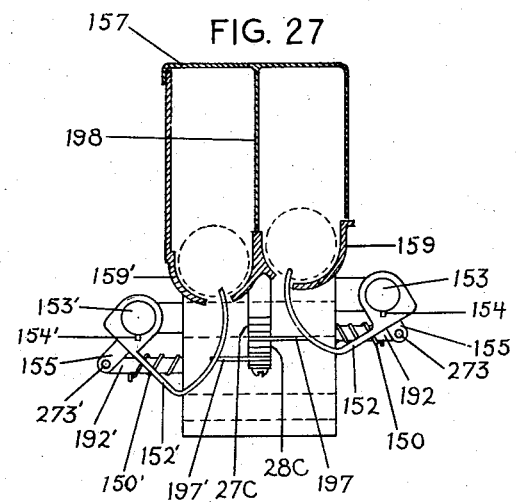
INVENTOR.
Edward G. Weiler
BY H. S. Babcock
ATTORNEY.

Aug. 1, 1944.  E. G. WEILER  2,354,896
COIN CONTROLLED VENDING APPARATUS
Filed Oct. 28, 1939  12 Sheets-Sheet 11

INVENTOR.
Edward G. Weiler
BY
H S Babcock
ATTORNEY.

Patented Aug. 1, 1944

2,354,896

UNITED STATES PATENT OFFICE 2,354,896

COIN CONTROLLED VENDING APPARATUS

Edward Grover Weiler, Columbus, Ohio

Application October 28, 1939, Serial No. 301,824

23 Claims. (Cl. 194—10)

The invention to be hereinafter disclosed relates to a coin controlled vending apparatus.

More particularly it comprises an apparatus which is coin controlled and which provides a dial for pre-selection of any of a plurality of articles, and provides for the automatic delivery of the article. It includes means for dispensing a wide variety of articles at a variety of prices and for automatically refunding to the customer as change the difference between the money inserted and the price of any selected article. It also includes means to prevent a customer from obtaining from the machine either more or less in value than the money deposited. It further includes separable operative and supply units each having novel features of construction and applicable to other uses than those herein described, but cooperating in the apparatus shown to effect a result not heretofore attained.

It is the principal object of the invention to provide a means for dispensing a wide variety of merchandise at different prices in a way that is particularly pleasing to a customer. It includes an attractive display of the merchandise having a code number and price marked on each article, together with a dial type selector with which the selection of merchandise is easily made by dialing the code number of the article in a way that is familiar to the general public. This selective apparatus not only selects the article which will be dispensed by the operation of the apparatus, but at the same time prepares the machine to respond only when coins equal to or greater than the value of the selected article have been deposited and at the same time prepares the machine for the delivery of the proper change.

The machine provides a visible indication to the customer of the value of the money he has inserted. The mechanical operation of the machine in moving a selected article from the storage shelves and delivering it is also visible through a window in the cabinet.

A further object of the invention is to provide common coin controlled mechanisms capable of performing all of the selective and change making functions of the machine, and all of the article delivery functions except that performed by a simple delivery element associated with each article storage channel so as to reduce to a minimum the mechanism individual to each class of articles vended.

Another object of the invention is to provide a change mechanism the operation of which is independent of the weight of the column of coins in the change device, thus permitting a large amount of change to be stored in the device and requiring very little energy for operation. Provision is also made to prevent the delivery of change and to refund the deposited coins when the selected merchandise is sold out. It also prevents the delivery of merchandise and refunds the deposited coins on any operation of the machine involving change when the particular change coins required in the transaction are exhausted, but it permits the operation of the machine on any transaction that does not require for change the particular change coins that are exhausted.

Another object of the invention is to provide for stocking any fast selling articles in several storage channels with provision for the automatic selection from these channels in rotation until all of these channels are empty.

To the accomplishment of the foregoing and related ends said invention, then, consists of the means hereinafter fully described and particularly pointed out in the claims. The annexed drawings and the following description set forth in detail certain mechanism embodying the invention, such disclosed means constituting, however, but one of various mechanical forms in which the principle of the invention may be used.

Throughout the drawings like reference characters designate the same parts in the different views.

In said annexed drawings:

Fig. 1 is a front view of the machine housed in a cabinet and showing by dotted lines the approximate relative locations of the elevator and storage shelves with a part of the front wall broken away to show in outline the lower end of a shelf and the driving mechanism and a short section of the shelf supporting bar 283.

Fig. 2 is a left hand side elevation of the device shown in Fig. 1, showing a few, only, of the shelf partitions and showing the delivery and restore bars.

Fig. 3 is a top plan view of the device shown in Fig. 1 showing by dotted lines the approximate relative locations of various parts.

Figure 5:
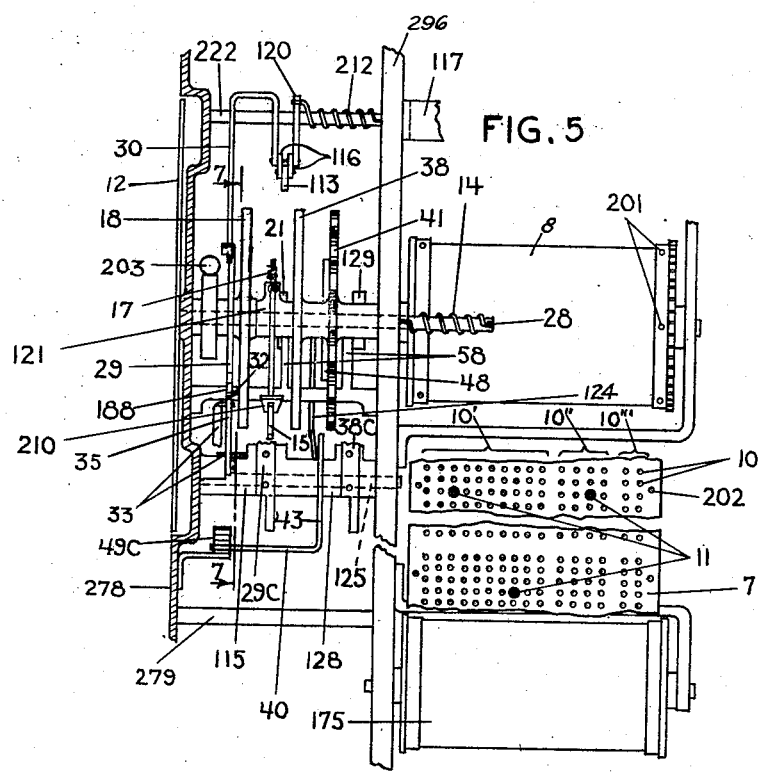
Fig. 5 is a right hand side elevation of Fig. 4, showing the door 278 in section and omitting part of belt 7.
Figure 6:
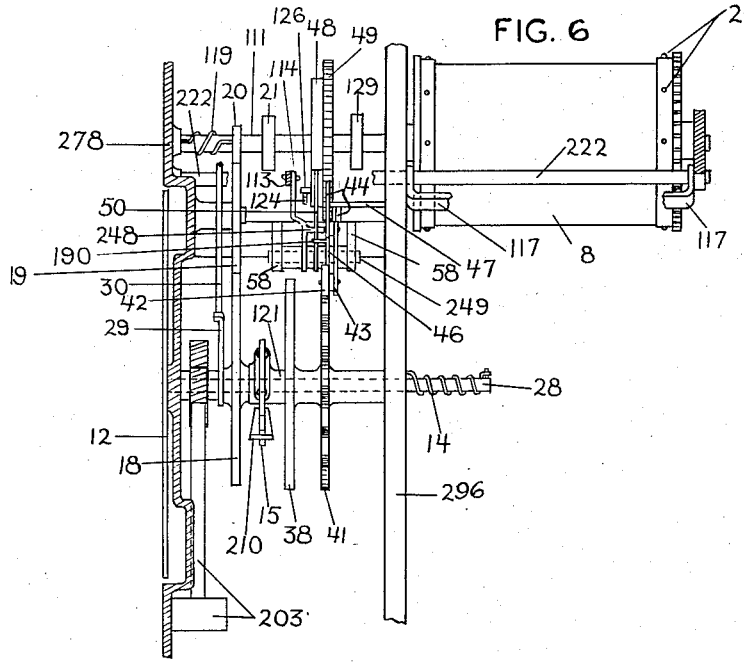

Fig. 6 is a top plan view of Fig. 5, omitting belt 7, a portion of shaft 222 and parts 33 and 35.

Figure 7:
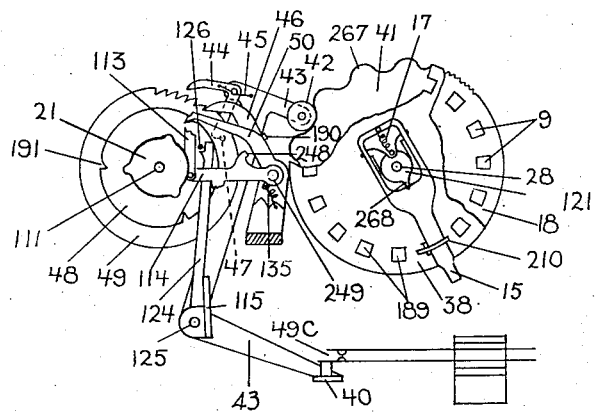

Fig. 7 is a cross section on line 7—7 of Fig. 5 looking in the direction of the arrows and omitting the supporting structure and showing only part of the gear teeth and ratchet teeth.

Fig. 8 is a rear elevation or right hand end view of Fig. 5, with the addition of shelf rotation selection elements.

Figure 4:
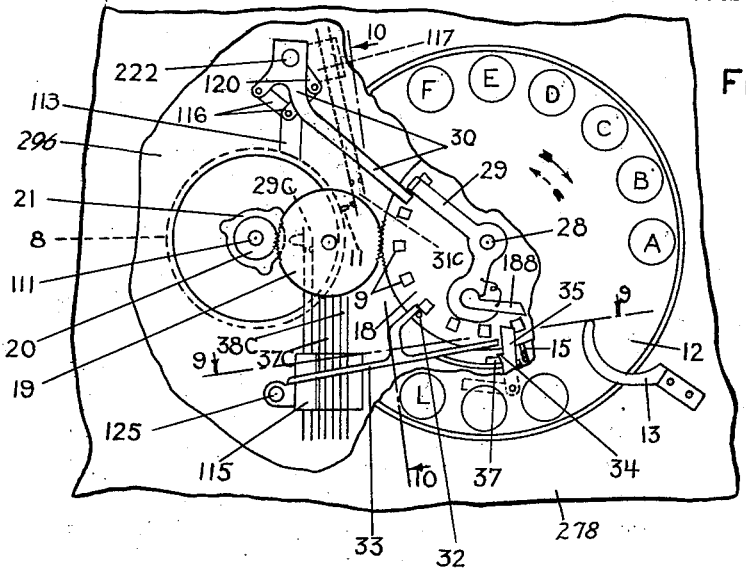
Fig. 4 is a front elevation of the dial selector with a part of the dial and of the front of the cabinet removed.

Fig. 9 is a fragmentary cross section on line 9—9 of Fig. 4 looking in the direction of the arrows.

Fig. 10 is a cross section on line 10—10 of Fig. 4 looking in the direction of the arrows, partly broken away and omitting belt 7.

Fig. 11 is a fragmentary front view showing the dial release magnet and portions of the dial release mechanism.

Fig. 12 is an enlarged side view of a price pin.

Fig. 13 is a bottom plan view of Fig. 12.

Fig. 14 is an enlarged detail cross section on line 14—14 of Fig. 8, looking in the direction of the arrows and showing a shelf rotation wheel and associated parts.

Fig. 15 is a top plan view of the shelf selection and control unit.

Fig. 16 is a right hand side elevation of Fig. 15 showing also a cable drive connection from shaft 70.

Fig. 17 is a left hand side elevation inverted with respect to Fig. 15, the contact 1C partly obscuring the contacts 42C and 43 C.

Fig. 18 is a fragmentary cross section on line 18—18 of Fig. 15 looking in the direction of the arrows, showing the shelf selection contact and related parts.

Fig. 19 is an end elevation of the elevator, together with the driving mechanism, with a section of the elevator broken away.

Fig. 20 is a top plan view of Fig. 19 partly broken away, showing also portions of a storage shelf and of the associated article delivery elements.

Figure 21:
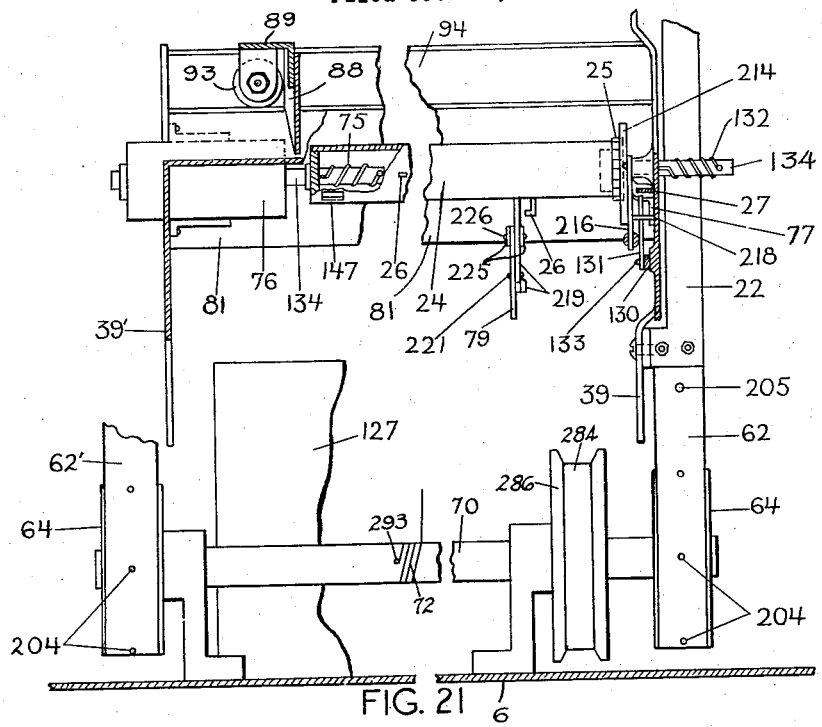

Fig. 21 is a fragmentary cross section on line 21—21 of Fig. 19, looking in the direction of the arrows, partly broken away.

Figures 22, 23:
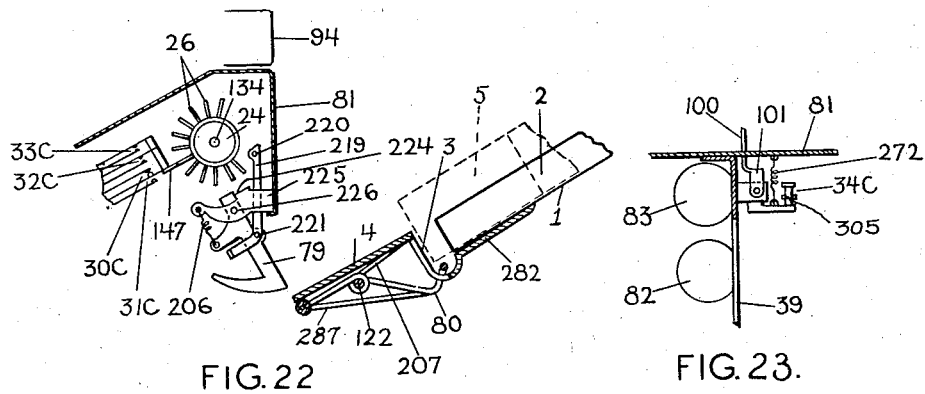

Fig. 22 is a fragmentary cross section on line 22—22 of Fig. 20 looking in the direction of the arrows.

Fig. 23 is a fragmentary cross section on line 23—23 of Fig. 19, looking in the direction of the arrows, showing the collect contact and associated parts, the contact being partially hidden by an insulator stud.

Figure 24:
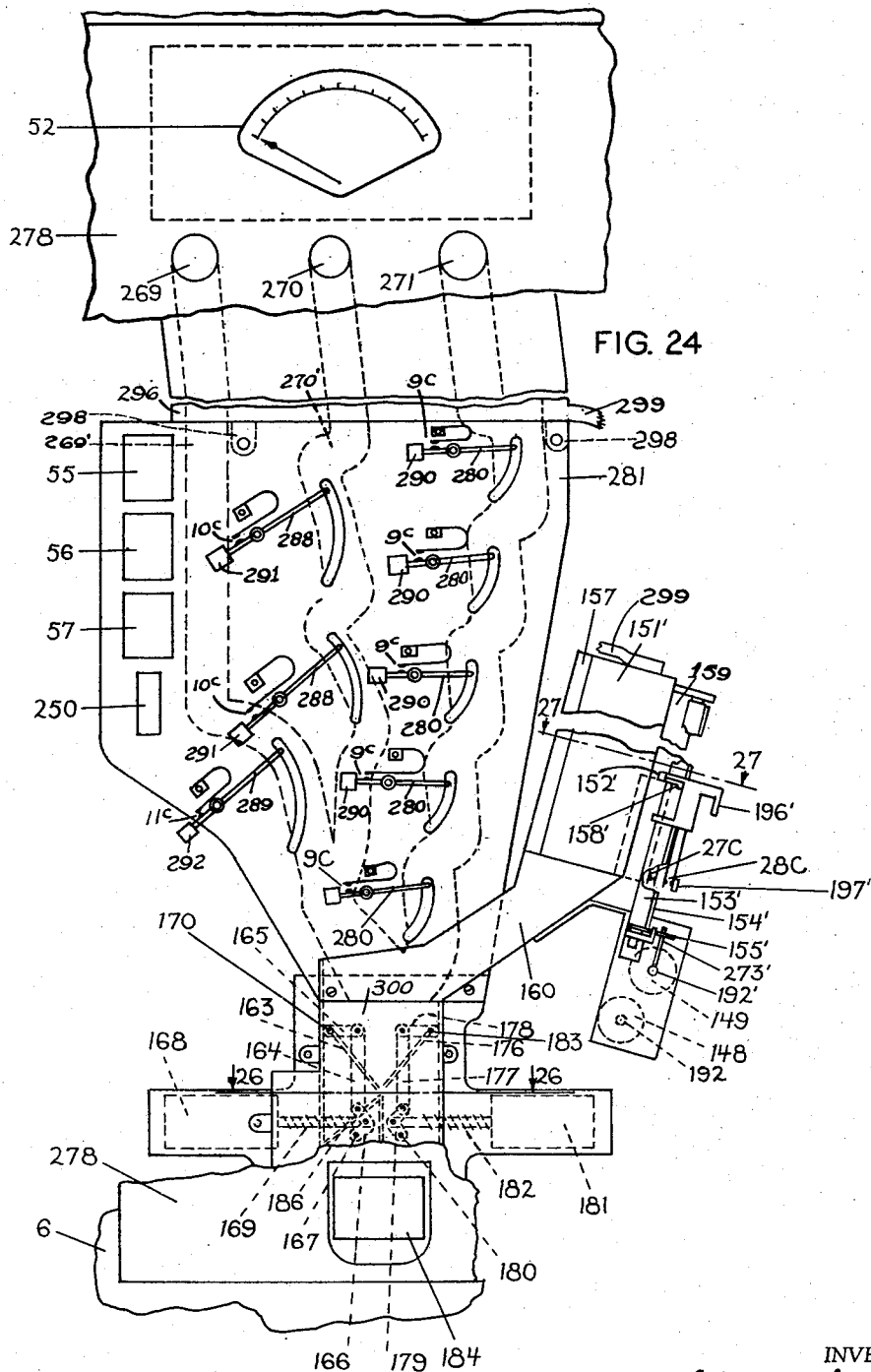

Fig. 24 is a front elevation of the central control unit showing the change mechanism, the collect and refund mechanism and the coin channels, the figure being partly broken away through the upper part of the channel and omitting the greater part of the front panel.

Fig. 25 is a right hand side elevation of Fig. 24 omitting the dial mechanism and the change mechanism, the break being through the lower instead of the upper part of the channels.

Fig. 26 is a sectional view of the coin receptacles taken along the line 26—26 in Fig. 24 looking in the direction of the arrows.

Fig. 27 is a cross section on line 27—27 of Fig. 24 looking in the direction of the arrows.

Figure 28:
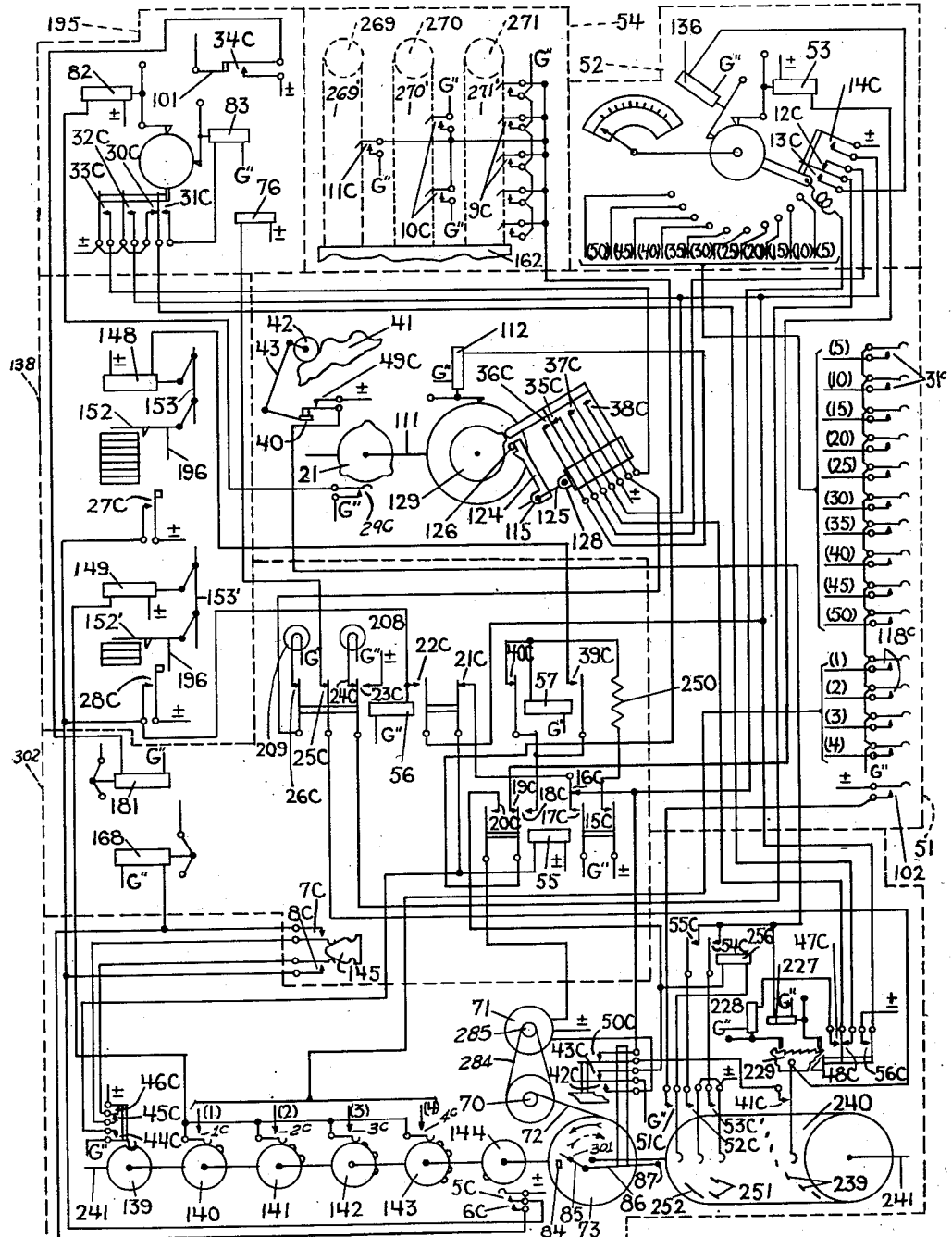

Fig. 28 is a wiring diagram showing the complete electrical system for the entire apparatus in detail, the larger units which are so referred to in the specifications, being "boxed" or enclosed in broken lines each such box being respectively designated by its particular character.

Figure 29:
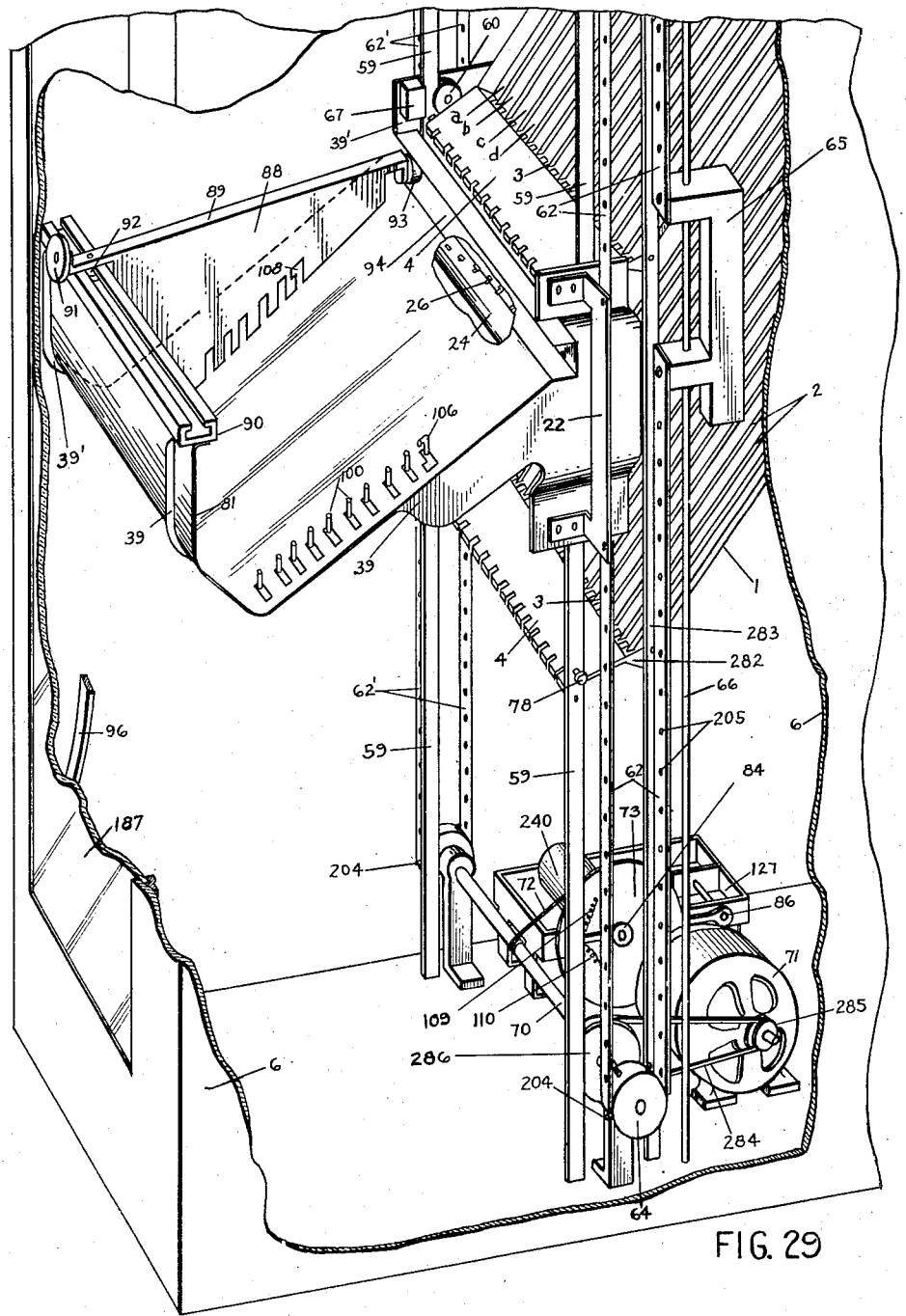

Fig. 29 is a perspective view of the lower left hand part of the device shown in Fig. 1 with the front of the cabinet partially cut away showing the lowermost storage shelves together with the delivery and delivery control mechanism, the elevator being shown near the lowermost point in its travel omitting the electrical contacts and other small details of construction.

General arrangement

The general arrangement of the machine as it appears to a customer and the operation of it by a customer will first be described briefly, omitting the details of the mechanism which will be described later.

As shown in Figs. 1, 2 and 3 of the drawings, the device may be housed within a cabinet 6 having doors or removable panels 274 and 275, at its top and right side respectively, and having a window 187 in its left side.

A series of sloping shelves 1 is provided and a delivery elevator 195 (Figs. 19, 20 and 29) is disposed to be driven up and down in front of these shelves by a motor 71 under control of a cycle control device designated as a whole as 127, which device controls also the delivery operation as will be explained later.

A door 278 is provided centrally of the front of the cabinet 6 on which is mounted apparatus referred to hereinafter as the coin control unit. The apparatus referred to hereinafter as the article selector unit and the change delivery unit are also mounted on this door. On either side of door 278 is a display space 193 and in the lower left hand corner (Fig. 1) of the front cabinet 6 is an article delivery receptacle 105.

Brief description of operation

The sloping shelves 1 are designated A', B', C', etc. (Figs. 1, 2 and 29) each shelf being divided by partitions into channels a, b, c, etc. Each of these channels is adapted to support a supply of articles to be vended. The class of article stored in each channel is assigned a code or number consisting of two digits the first digit being a letter corresponding to a channel a, b, c, etc., and the second digit being a letter corresponding to a shelf A', B', C', etc., so that the code designates the shelf and channel in which the article, corresponding to a given code, is stored. For example, the code for an article stored in channel f on shelf D' is "FD." Letters are used instead of numbers for designating the channels and shelves so as to permit the use of a larger number of channels and shelves than there are numerical digits in the decimal numbering system and at the same time avoid confusion to the customer in operating the machine by the use of the codes. A sample of each article vended is placed in the display space 193 plainly marked with the price of the article and with the code. This code is used by the customer in operating the machine to select the desired article as explained later.

In operating the machine the customer first determines the code of the article desired and its price by viewing the samples in the display space. A white lamp 208 is normally lighted indicating the machine is ready for operation but the customer is instructed that if this lamp is not lighted he should press a button 145 which causes the restoral of all parts to normal positions ready for the operation of the machine lighting the white lamp. The customer then dials the two digit code of the article on dial 12 in a manner similar to the operation of a telephone dial. That is, he places a finger in the hole of the dial 12 corresponding to the first digit of the code (in this case F) spins the dial to the stop 13 then releases it. He then dials the second digit of the code (in this case D) and releases the dial. The customer then inserts coins (nickels, dimes or quarters) in the coin entrances 269, 270 and 271 respectively equal to or greater than the price of the article. When sufficient coins are inserted an elevator 195 moves downward between the ends of the shelves and the window 187 and as it passes the shelf on which the selected article is stored one of the articles is released from the selected channel of that shelf and falls into the elevator pan. The elevator continues downward past all the shelves then moves upward and during its upward movement the article is pushed off of the elevator and falls into a delivery opening where it is accessible to the customer.

The machine consists of several assemblies of mechanical and electrical elements each such assembly being constructed essentially as a mechanical unit adapted to be mounted in a convenient manner in the framework of the machine. These units are interconnected by suitable electrical circuits which together with mechanical interactions between certain of the units cause them to interact in a definite sequence so that collectively they perform the functions of the entire machine. In the wiring diagram (Fig. 28) the electrical circuits of the various units are shown separately enclosed by broken lines, the parts of the mechanism which affect the electrical circuits in these units being shown diagrammatically. The lines from the numerals that are used to designate the various units as a whole are extended to the dotted lines enclosing the respective units.

In this description the symbol ± will indicate the live side of an alternating current electric circuit furnishing power to the machine and G" will indicate the grounded side of the circuit. It is to be understood that direct current can also be used to operate the machine. Electric contacts are shown in the various drawings in relation to the elements which operate them but the electrical connections are shown only in Fig. 28 and it is to be understood that any reference to electric circuits hereinafter refers to Fig. 28. In this figure all contacts as well as the symbols of mechanical elements associated therewith are shown in normal positions representing the condition of the machine ready to be operated by a customer. In Fig. 28 the numerals in parentheses indicate connections over a common line to points at the opposite end of the common line designated by corresponding numerals in parentheses.

*Article storage and releasing unit*

In the rear of and spaced considerably from window 187 (Fig. 1) is angularly disposed a set of shelves or article chutes 1 downwardly inclined toward the window (Fig. 2). The lower end of each shelf is suitably secured to and supported on a cross member 282 and the upper end is supported on a cross member 277, the rear end of each member 282 and 277 being attached by brackets 276 (Fig. 20) to the adjacent wall of the cabinet. The front end of each cross member 282 is attached to a straight vertical bar 283 (Figs. 1 and 3) and the front end of each cross member 277 is attached to an L shaped bar 283', the vertical bars 283 and 283' being attached to the top and bottom of the cabinet and suitably braced.

The storage shelves 1 are mounted one above the other, with the lower ends of all shelves in the same vertical plane, and each shelf is divided by the partition walls or guides 2 into a number of storage chanels a, b, c, etc., which may be of different width although for clearer showing indicated in Fig. 1 as all of the same width but each being slightly wider than the article to be vended therefrom. At the lower end of each channel is a ledge 3 and below the ledge is a short extension 4 of the channel but at a slightly lesser slope, the ledge 3 and the extension or apron 4 being a part of the cross member 282 (see Fig. 22).

At the lower end of each channel a, b, c, etc., is a releasing lever 80 (Fig. 22) having the general shape of a hollow rectangle (Fig. 20) and pivoted in its two opposite sides on pivot 122 attached to support 282, with one of the adjacent sides resting in a channel along the lower edge of the ledge 3 and held in normal position by a spring 207, below the path of a descending article. The two pivoted sides of the lever 80 are bent at the pivot point and near their ends as shown in Fig. 22 and braces 287 are attached to them to add rigidity to the delivery lever. These storage channels a, b, c, etc., can be filled at the rear of the apparatus and the forward slope of the shelves is such that the packages 5 will slide by gravity toward the lower ends of the shelves until the forward packages are engaged by the respective ledges or package stops 3, the lower end of each lowermost package extending over the upper side of the delivery lever 80 (Fig. 22). The apparatus shown is intended particularly for rectangular or cylindrical shaped packages with smooth surfaces, preferably having one dimension greater than the others, and the packages are placed in the channels lengthwise. The operation of the lever 80 in releasing an article from one of the storage channels will be explained in the description of the common article delivery unit.

*Common article delivery unit or elevator*

A common delivery unit designated as a whole by the numeral 195 is shown dotted in Figs. 1, 2 and 3 as in an operating position. It contains mechanism for channels (a, b, c, etc.) selection and is adapted to cooperate with the cycle control unit, described later, for shelf (A', B', C', etc.) selection, to cause the release of a selected article from the storage unit and to effect the delivery of said article to a point accessible to the customer. The electric circuits of this unit, including symbols of certain of the mechanical parts, are shown in the broken line enclosure 195 in Fig. 28. This common delivery unit including the end frames 39 and 39' the pan 81 and the mechanism shown in Figs. 20, 21 and 22 will, for the sake of brevity, be referred to hereinafter as the elevator 195. It is disposed to move vertically along guides 59 in the space between the lower ends of the shelves and the end of the cabinet containing the window 187.

The movement of the elevator is controlled by a reversing type motor 71 driving, by means of pulley 285, belt 284, pulley 286 and shaft 70, two pulleys 64, one on either end of the shaft 70 (Figs. 19 and 21) which pulleys operate front and rear steel belts 62 and 62' (Fig. 21) over two idler pulleys 63 (Figs. 19 and 20), said steel belts serving to support the elevator at either end and to move it up or down by the power transmitted from the motor. Each belt 62 and 62' has an upper and lower section as will be explained. The upper idler pulleys 63 are attached to a shaft 69 and the lower pulleys 64 are attached to the shaft 70, the shafts 69 and 70 being supported by suitable bearings attached to the top and bottom respectively of the main cabinet. Pins 204 are provided in the pulleys 64 which index with holes 205 in the belts 62 and 62' so that the elevator is at all times positively positioned with respect to the pulleys 64. The belt 62 (Fig. 19) consists of an upper section which passes over one of the pulleys 63 and a lower section which passes over one of the pulleys 64. On one side of the pulleys the upper section of the belt is attached to the upper end of a plate 22 and the lower section to the lower end of this plate the plate 22 serving as a convenient means of attaching the belt to elevator frame 39. On the opposite side of the pulleys the upper and lower sections of the belt 62 are attached to the upper and lower ends respectively of a counterweight 65 which slides on a vertical rod 66, made fast to the top and bottom of the cabinet, and is for the purpose of counterbalancing the weight of the elevator. The rear belt 62' (Fig. 21) is similarly attached to a second or rear plate 22 and a rear counterweight 65 the belt operating over the rear pulleys 63 and 64 in the same manner as belt 62, the rear plate 22 being attached to the rear frame element 39' of the elevator. The elevator, in addition to being attached to the belts 62 and 62' by plates 22, is supported at either end by rollers 60 and 61 and guide blocks 67 and 68 (Figs. 19 and 20) attached to the front and rear frame elements 39 and 39' which rollers or blocks roll or slide along the front and rear vertical guide bars 59 thus guiding the elevator in its vertical movement as controlled by the belts 62 and 62' and supporting the elevator in its proper position. The elevator makes one movement downward, starting from the normal position at the top passing the lower ends of all the shelves, and a return movement upward during each cycle of operation of the machine. The electrical connections to the apparatus on the elevator are carried through suitable flexible cable, not shown.

The elevator is provided with a series of triggers 79 (Figs. 21 and 22) one for each of the channels or article chutes a, b, c, etc., in the article storage unit and means is provided to rock a predetermined one of these triggers on pivot 226, during the downward movement of the elevator, at a point just above a predetermined shelf A', B', C', etc., so as to effect the release of an article from said predetermined channel of said predetermined shelf. The shelf at which this occurs is determined by the cycle control unit as explained later. The particular trigger 79 that is so actuated is determined by the preconditioning of the mechanism of the elevator by a series of circuit closures to the magnet 82 (Figs. 19 and 28). Assume that six such circuit closures (corresponding to the first digit F of a code) are received to energize and release the magnet 82 six times.

Referring to Figs. 19 and 21, this advances the ratchet wheel 25 and the cylinder 24 attached thereto six steps against the torsion of spring 75, the plunger of the solenoid magnet 82 being returned after each step by spring 213, and causes the sixth channel selection finger 26 on cylinder 24 to be brought into proper position for the release of an article from the sixth channel or channel (f), as explained later.

The spring 75, which is attached at one end to the cylinder 24 and at the other end to the shaft 134, tends to hold the cylinder and the gear 25, attached thereto, in normal position with the stop pin 263 (on ratchet 25 attached to cylinder 24) engaging the arm 77. The arm 77 which is attached to the shaft 134 (Fig. 19) is held in normal position against the stop 264 on the elevator pan by the torsion of spring 132 (Fig. 20).

The above mentioned stepping action (resulting from the first movement of the dial) is accomplished by pawl 214 (Fig. 19) fulcrumed at 215 to the elbow 216, one end of which is pivoted to the plunger of the solenoid 82 while the other end is pivoted to the elevator frame on pivot 303. The pawl 214 is kept normally disengaged from the teeth of ratchet 25 against the tension of a spring 217 by a stop pin 103 (attached to the frame 39) engaging a lug 74 on pawl 214. As the solenoid 82 is energized and its plunger drawn toward the left in Fig. 19, against the tension of spring 213, lug 74 of pawl 214 moves free of stop pin 103 and spring 217 causes pawl 214 to engage a tooth of ratchet 25, continued travel of the solenoid plunger causing a one step movement of ratchet wheel 25, and of cylinder 24 attached thereto, return movement of ratchet 25 being prevented by pawl 27, normally held seated by spring 304.

On the first step of the ratchet wheel 25 a lug 147 on the cylinder 24 (Fig. 22) at a point beyond fingers 26 (Fig. 21) is moved out of engagement with the associated contact springs, causing contact 30C to open and contacts 31C, 32C and 33C to close for a purpose explained later. These are referred to as the elevator normal contacts, this being the actuated position of them. The normal position of the elevator normal contacts is as shown in Fig. 28.

Just before the upper edge of the elevator 195 reaches a point opposite the predetermined shelf 1 on which the selected article is stored a circuit is closed, as will be explained later, to energize the delivery magnet 76. This energization of magnet 76 will cause the cylinder 24 (Fig. 21) to move to the left against the longitudinal compression of spring 132, and in turn cause the arm 77 to engage a pin 78, corresponding to the selected shelf, on the vertical guide 59, and at the same time cause the particular finger 26 (Figs. 21 and 22) which has been selectively positioned as previously explained, to enter a hole 220 in link 219 pivoted at 221 to the trigger 79 associated with the channel f selected. Owing to the downward movement of the elevator the engagement of the arm 77 with the pin 78 imparts a counterclockwise rotary movement to the cylinder 24 against the torsional tension of spring 132, causing the aforementioned finger 26, through the medium of the link 219, to rock the trigger 79, on pivot 226 on support 225 attached to the elevator frame, bringing the trigger 79 into engagement with the delivery lever 80, (Figs. 20 and 22) on the selected channel, which lever in turn is rotated sufficiently on the pivot 122 attached to the shelf to lift the lower end of the lower package 5 clear of the ledge 3 and the package slides by gravity over the surface 4 into the elevator pan 81, the elevator, during the time this is taking place, having moved to a point slightly below the selected shelf. After the arm 77 passes out of engagement with pin 78, due to the rotary movement of the arm 77, the elements 24, 26, 79, 219 and 80 are quickly restored to the position they were in before being displaced by the arm 77 by springs 132, 206 and 207.

The trigger 79 is normally held in position against the stop 224 by the spring 206 and the link 219 is held in position against stop 224 by its weighted end. One or more of the fingers 26 may engage the edge of a link 219 of a channel other than the one selected, but inasmuch as the finger 26 has not entered the hole 220 in the link 219, the latter will be pushed out of the way by the engagement of the finger 26 with the sloping edge of the link 219 when cylinder 24 is rocked by arm 77 so that the trigger 79 will not be operated for any channel except the one selected.

The column of packages in the selected channel now slides by gravity until the lowermost of the remaining packages engages the ledge 3 which arrests further movement of these packages. There is a pin 78 properly positioned to effect the above delivery action for each shelf but the arm 77 moves clear of these pins except when the magnet 76 is energized to bring it into engagement with the pin 78 at proper position corresponding to the shelf on which the article selected is stored. It will be noted also that the fingers 26 move clear of the links 219 except when the cylinder 24 is moved to the left by the energization of the magnet 76, thus permitting free rotary movement of the drum 24 in stepping into position for channel selection or in restoring to normal position. There is a finger 26 on the cylinder 24 for each channel on a shelf, the corresponding channels on all shelves being vertically aligned. These fingers are placed in staggered position on the cylinder and are so positioned that the rotary stepping of the cylinder as previously explained, will place a predetermined finger 26 into operative position adjacent the hole 220 in the link 219 associated with the channel selected.

A support 89 (Fig. 19) to which is attached a vertical delivery plate 88, is adapted to move lengthwise of the elevator pan 81 positioned at one end by two rollers 92 operating in a guide channel 90, attached to the elevator pan 81, and at the other end by a roller 93 moving in the elevator channel 94. Bars 96 and 97 (Fig. 2) are attached to the frame of the machine and a pivoted bar 95 is pivoted to the frame of the machine on the pivot 199 so as to be in vertical alignment with a roller 91 on the delivery plate support 89, being supported so as to allow the roller 91 free movement along the bars. As the elevator approaches its lowest point the roller 91 on the delivery plate support 89 displaces the pivoted bar 95. When the roller passes beyond the end of the pivoted bar 95 the latter is returned to normal position by the spring 98 against the stop 99. At this point the cycle control unit, the circuits of which are shown within the broken line enclosure 127 in Fig. 28, causes the direction of the driving motor 71 to be reversed, as explained later, and the elevator moves upward. As the elevator moves upward the roller 91 engages first the pivoted bar 95, then the under or right side in Fig. 2 of the delivery bar 96, causing the delivery plate support 89 and consequently the delivery plate to be moved toward the front end of the elevator, pushing ahead of it the package which had fallen into the delivery pan 81, as previously explained.

The package engaging the collect fingers 100 (Fig. 20) in the path of the package rocks the bar 101 (Fig. 23) against the tension of spring 272, which in turn allows the collect contact 34C to close and operate the collect magnet 181, as explained later, the contact 34C being held normally open by a lug on the bar 101 (Fig. 19). The package is ejected from the elevator pan, falls into the delivery chute 104, (Fig. 2) and passes to the delivery opening 105, where it is accessible to the customer.

One of the collect fingers 100 is fittted with a locking lug 106 (Figs. 19 and 20) which when deflected by a package engages a lug 107 on the delivery plate 88 holding the collect finger in this position while the delivery plate is in its extreme position. This insures the fraction of a second for time allowance of closure of the collect contact 34C to insure the complete operation of the collect mechanism to dispose of the coins, as explained later. If no package is delivered the fingers 100 pass freely through slots in the delivery plate and the lug 106 passes freely through the opening 108 in the delivery plate so that the collect contact 34C is not closed. On the further upward movement of the elevator the roller 91 engages the left or under side of the restore bar 97, moving the delivery plate to normal position at the left end of the elevator pan, as the elevator reaches the upper limit of its movement. At this point the motor circuit is opened by the cycle control unit, as explained later, and the elevator comes to rest at the uppermost point of its travel.

A magnet 83 is provided to restore the elevator mechanism to normal. The operation of this magnet rocks the offset lever 130 on pivot 133, attached to the elevator frame 39, (Fig. 19) which raises the link 131 into engagement with the tail of the pawl 27 which is moved out of engagement with the ratchet wheel 25, allowing the cylinder 24 to restore to normal under the power of the spring 75 (Fig. 21) one end of spring 75 being attached to cylinder 24 and the other end to shaft 134. The spring 266 on the plunger of the solenoid magnet 83, (Fig. 19) causes the lever 130 to be restored to normal position against the stop 265 on the elevator frame. The insulating lug 147 on the cylinder 24, when this cylinder restores to normal causes the elevator normal contacts 30C, 31C, 32C and 33C to return to normal position, as shown in Fig. 22.

*Cycle control unit*

A cycle control unit is provided, the mechanism of which is shown in Figs. 15, 16, 17 and 18. It is adapted to control the operation of the driving motor, to determine the shelf from which an article will be released and to control also, by means of electric contacts and circuits, the operation of the various pieces of apparatus in proper sequence in carrying out a cycle of operations of the machine. The electric circuits of this unit including symbols of certain of the mechanical parts, are shown in the broken line enclosure 127 in Fig. 28. The location of the unit in the machine is shown by the box designated 127 in Fig. 1.

A pulley 73, a drum 240 and cams 139, 140, 141, 142, 143 and 144 are all rigidly attached to a shaft 241 which is supported at either end by bearings in the frame 242 (Fig. 15). A toggle link 86 (Figs. 15 and 17) attached to shaft 87 is normally held in downward position by its interaction with link 85, pivoted to the frame 242 on a pivot 123. The upper spring of a contact 50C is shown in Fig. 15 the other contacts 42C and 43C in the same contact spring assembly being shown in Fig. 28. This spring assembly is attached by suitable insulators to shaft 87 as shown in Fig. 17, being partly cut away and partly hidden in this figure. The free ends of these springs are connected by a suitable insulator to the frame 242 so that with the link 86 in downward position the contacts 50C and 43C are held closed and the contact 42C is open.

A flexible cable 72 is wound around the shaft 70 acting as a drum (Figs. 16 and 21) and one end of the cable is attached to a pin 293 on shaft 70. The other end of the cable 72 passes once around the pulley 73 and is attached to the pulley at 294 (Fig. 16).

When the contact 20C is closed by the operation of relay 55, as explained later, a circuit is closed from G" through contacts 43C and 20C and motor 71 to ± operating the motor to move the elevator 195 downward. The rotation of shaft 70, during the downward movement of the elevator, winds an additional amount of the cable 72 on the shaft 70 which causes the rotation of pulley 73, clockwise in Fig. 16, and since pulley 73 and cam 139 are both rigidly attached to the shaft 241 this winds up and places additional torsion on spring 211, one end of which is attached to cam 139 and the other end attached to frame 242. Near the beginning of the downward movement of the elevator the cam 139 actuates a spring assembly to close contact 44C and open contacts 45C and 46C. The contact 44C closes a circuit from G" to hold relay 55 operated which in turn holds the motor circuit closed at contact 20C during the downward movement of the elevator.

As the elevator approaches the lowest point in its movement, a tongue on the reversing lever 84 (Figs. 15 and 17), extending through a slot in the pulley 73 engages the link 85 rocking this link on its pivot 123 thereby rocking the associated link 86 to cause the toggle joint formed by the links 85 and 86 to move upward over its dead center in turn rocking the shaft 87. The lever 84 is pivoted at 301 to pulley 73 and is held in its central position by springs 109 and 110 this spring structure permitting the lever 84 to perform its function when there is a slight variation in the extreme movements of the pulley 73. The rocking of the shaft 87 causes the aforesaid spring assembly to open contacts 43C and 50C and close contact 42C. The motor circuit is then opened at 43C and closed at 42C reversing the direction of the motor 71 so that the elevator moves upward. The opening of the contact 50C is to prevent the operation of the delivery magnet 76 during the upward movement of the elevator.

During the return upward movement of the elevator the direction of rotation of shaft 70 is reversed so that cable 72 is fed out and the torsional tension of spring 211 causes the rotation of the pulley 73 in the reverse direction. The relative sizes of the shaft 70 and pulley 73 are such that the pulley 73 makes approximately one revolution during the downward movement of the elevator and restores during the upward movement so that the pulley 73 and the cams and drum which are attached to the same shaft 241 as the pulley 73 operate at all times in synchronism with the elevator 195. The contact springs associated with cams 139, 140, 141, 142, 143 and 144 and with the drum 240 are thereby actuated at intervals as required, relative to the cycle of operation of the elevator, so that the contacts on these springs perform their functions in proper sequence as explained later.

Near the end of the upward movement of the elevator the tongue on the reversing lever 84 engages the link 85 rocking downward the toggle joint formed by links 85 and 86 in turn rocking the shaft 87. This again moves the above mentioned spring assembly to close contacts 43C and 50C and open contact 42C. This opens the motor circuit at contact 42C and the elevator comes to rest at its uppermost or normal position. At the same time the spring assembly associated with cam 139 moves into a notch in this cam opening contact 44C and closing contacts 45C and 46C. Contact 44C opens the circuit to relay 55 releasing it thus preventing the reclosure of the motor circuit at contact 20C.

The spring assemblies associated with contacts 41C, 46C, 51C, 52C and 53C (Fig. 15) are attached by suitable lugs and insulators to the frame 242. Similarly the spring assemblies associated with contacts 1C, 2C, 3C and 4C are attached to shaft 87 and extend above the associated cams so that these contacts are actuated by the cams only during the downward movement of the elevator while the spring assembly associated with contact 5C extends below the cam 144 and is actuated by the cam 144 only on the upward movement of the elevator because of the rocking movement of the shaft 87 as previously explained. The complete spring assemblies for all contacts together with symbols to indicate the mechanical parts that operate them are shown in Fig. 28.

The cycle control unit is preconditioned for shelf selection by a series of electric pulses received by the magnet 227 from ± through contact 49C and magnet 227 to G" due to a series of makes and breaks of contact 49C which result, as previously explained, from the operation of the dial for the second digit of the number dialed by the customer to select an article. Each forward movement of the plunger of magnet 227, when the magnet is energized, rocks the pulsing lever 232 pivoted to frame 242 of the unit causing the pawl 233, normally held out of engagement with rack 229 by the stop 246 against the tension of the spring 235, to be moved by the spring 235 into engagement with a tooth in the rack 229 advancing this rack one step. When the circuit to the magnet 227 is opened the lever 232 is restored by the spring 234. The rack 229 is thus moved one step to the left (Fig. 15) for each circuit closure or pulse received, return movement by the spring 243 (Fig. 18) being prevented after each step by the engagement of the lug 231, in the rack 230. An insulator 247, which is on the lower spring of the contact 41C, which contact spring is attached to the rack 229, is thus brought into alignment with the path of one of the lugs 239 on the drum 240, each of these lugs corresponding to a shelf A', B', C', etc., of the storage unit.

The spring 244 (Figs. 15 and 18) serves to hold the rack 229 in position so as to prevent the rack from being displaced by the pressure of the lug 239 against the contact spring 41C. On the first step of the rack 229 a lug 223 thereon, moving out of engagement with the center spring of contacts 47C and 48C, causes contact 48C to open and causes contacts 47C and 56C to close. These contacts are referred to as the cycle control normal contacts and this represents the actuated position of them. The normal position of the cycle control normal contacts is as shown in Figs. 15 and 28. Their functions will be explained in connection with the general description of the operation of the machine.

A magnet 228 (Figs. 15 and 16) is provided which when energized causes the restoral of the mechanism of the cycle control unit to normal position. A U shaped release bar 236, pivoted at either end on shaft 237, is provided having an arm 238 attached thereto the end of arm 238 being pivoted to the plunger of the magnet 228. When the magnet 228 is energized, as is normally done near the end of a cycle of operation of the machine, its plunger, against the compression of spring 245, rocks the release bar 236 on the shaft 237. The release bar 236 engages a projection on the rack 229 rocking the rack 229 on shaft 237 raising the lock tooth 231, on the projection of rack 229, out of engagement with the lock rack 230 allowing the spring 243 (Fig. 18) to restore the rack 229 to normal position. The lug 223 on rack 229 engages the insulator on the cycle control normal contacts restoring these contacts to normal position. In the meantime the shaft 241 and the cam and drums attached thereto will have been restored to normal position by the return of the elevator to normal position as previously explained.

Article selector and price setter unit

An article selector and price setter unit, represented as a whole diagrammatically in the broken line enclosure 51 in Fig. 28, is provided comprising a dial 12 (Figs. 4 and 5) generally similar to a telephone dial, a dial mechanism associated therewith and a price setter associated with the dial mechanism as shown in Figs. 5, 6, 7 and 10. The dial mechanism is adapted, on the operation of the dial, for the first digit of the code of the selected article, to cause a series of momentary closures of contact 29C (Figs. 4 and 28) which create in the associated electrical circuits what are commonly referred to in the telephone art as pulses which pulses are for the purpose of actuating the magnet 82 of the elevator 195 to precondition the mechanism of the elevator, as previously explained, to select a channel a, b, c, etc., from which the desired article is to be vended corresponding to the hole A, B, C, etc., respectively, of the dial. The dial mechanism is adapted, on the operation of the dial for the second digit of the code of the selected article, to cause a series of momentary closures of contact 49C creating a series of pulses which are for the purpose of actuating the magnet 227 of the cycle control unit to precondition the mechanism of the cycle control unit, as previously explained, to select a shelf A', B', C', etc., from which the desired article is to be vended corresponding to the holes A, B, C, etc., respectively of the dial.

Simultaneously with the pulsing of contact 29C on dialing the first digit of the code of the article and the pulsing of contact 49C on the second digit, the dial is adapted to so position the price belt 7, on drums 8 and 175 (Fig. 5) that price pin or pins 11 which have been preset in a row of holes 10 corresponding to the selected article, as explained later, will be brought directly underneath the price and change contact springs 31C and 118C. The springs of contact 31C, a pin 11 and price drum 8 are shown in this relationship in Fig. 4, these parts being dotted in this figure since they are at the rear of the coin channel structure 296 as shown in Fig. 10. The penny change contact springs 118C (Fig. 10) are in the same relation to a price pin 11 as are the springs of contact 31C in Fig. 4 but are hidden in this figure by the springs of contact 31C. It is to be understood that the price belt 7, of which only a section is shown in Fig. 5, is in the form of an endless spring steel belt extending around the drums 8 and 175 as shown in Fig. 8, being omitted from Figs. 6 and 10 for clarity of the drawings.

A price pin 11, shown enlarged in Figs. 12 and 13, is formed with an annular recess and slots at one end as shown so that the pin may be snapped into a hole in the price belt 7 and be held securely, by combination of friction and the spring action in the prongs formed by the slots in the pin itself, and yet be readily moved from one hole to another to permit changing the price of an article.

One row of holes 10, which includes ten holes 10' and four holes 10'', is provided in the price belt 7 corresponding to each class of articles vended and in setting the machine for operation each of these rows of holes is fitted with one or two price pins 11, positioned in accordance with the price of the corresponding article. Counting from left to right the first one of the holes 10' corresponds to a 5 cent unit of value, the second hole to 10 cents (two 5 cent units of value), the third to 15 cents, etc., each hole counting from left to right corresponding to a 5 cent unit of value, or multiple thereof when a pin is placed therein. Similarly a pin in one of the holes 10'', counting from left to right, determines the number of pennies that will be delivered in change when the machine operates. The price of the article corresponding to any row of holes 10 is therefor the value represented by the position of the pin in the row of holes 10', less the number of pennies in change represented by the position of the pin in the row of holes 10''. If the price of the article is an exact multiple of 5 cents no price pin will be placed in any of the holes 10'' corresponding to this particular article since no pennies change will be required.

In each row of holes 10 there may also be provided two holes 10''' for use in connection with the delivery of the same class of merchandise from two or more shelves in rotation, as explained later in this description.

A suitable recess is provided in the door 278 (Fig. 5) for the dial 12, the dial being rigidly attached to dial shaft 28 which is adapted to rotate in bearings in the door 12 and in the upper coin structure 296. Designations A, B, C, etc., which are printed on the wall back of the holes in the dial serve to identify the respective holes when the dial is in normal position shown in Fig. 4. Wheels 18, 38 and 41 are adapted to rotate on shaft 28 but are not attached to it.

A stepping arm 15 (Fig. 7) is provided pivoted to two ears on a support 121 which is attached to shaft 28 so that the arm 15 rotates along with the dial, the arm 15 being normally held in a central position, as shown in the top plan view Fig. 6, by engagement of a tit 268, on support 121, with an indentation in the inner edge of arm 15. Tension spring 17 (Fig. 7), attached at one end to arm 15 and at the other end to support 121, tends to rock the lower end of arm 15 toward the wheel 18 (Fig. 6) when the arm is moved from its central position toward wheel 18 and tends to rock it toward wheel 38 when moved from its central position toward this wheel but when in its dead center position there is no component of force of the spring 17 to move the arm 15 on its pivots.

Arm 23 (Fig. 4), on support 115 which is pivoted on shaft 125, has three positions, as explained later, and its position determines whether it will react on arm 15 to rock arm 15 toward wheel 18, toward wheel 38 or not rock it at all when arm 15 is rotated by the rotation of the dial 12. In Fig. 9 (a fragmentary cross section on line 9—9 of Fig. 4) is shown a cross section of the lower end of arm 15 and also a part of arm 33. When dial 12 is rotated in a clockwise direction for the first digit of the code (for example FD) of a selected article, as shown by the full line arrow (Fig. 4), the stepping arm 15, rotating with the dial, engages the edge 16 (Fig. 9) on arm 33, which at this time is in its normal or upper position, and since the edge 16 is at an angle relative to the path of the lower end of arm 15, the arm 15 is moved by a sliding motion on edge 16 off of dead center toward wheel 18. The spring 17 acts to continue the rocking movement of arm 15 toward wheel 18 causing the edge of a wedge shaped part 210 on arm 15 to engage the sixth hole 9 (which hole corresponds to the dial finger hole F the first digit in the code and the sixth hole in the dial) in the channel selection gear 18 rotating the gear 18 with it as the dial returns to normal under the power of the spring 14 and under the speed control of any practical well known governor controlled brake 203. The gear 18 is provided with a plurality of holes 9, angularly spaced about a circumference in the gear distances corresponding to the angular spacings of the finger holes A, B, C, etc., in the dial 12, the holes 9 being so positioned, when gear 18 is in normal position, that the wedge 210 engages the first, second, third, etc. hole 9 corresponding to the first, second, third, etc., finger hole A, B, C, etc., used in operating the dial.

An arm 30 (Fig. 4), in the form of an inverted U at its upper end (Fig. 5), is pivoted on shaft 222 and is interconnected by two links 116 to an arm 120 which is rigidly attached to shaft 222. The inner ends of the links 116 are pivoted to the upper end of a vertical link 113, the lower end of link 113 being pivoted to a dial release rocker arm 114 (Fig. 11) and held against vertical movement by the spring 200 acting through the solenoid plunger on the rocker arm 114. A torsion spring 212 (Fig. 5), attached at one end to channel 296 and at the other end to arm 120 on shaft 222, tends to rotate the shaft and, through the medium of the links 116, tends to rock the arm 30 counterclockwise in Fig. 4. The arm 30 is normally held in the position shown in Fig. 4 by the arm 29, which is rigidly attached to shaft 28, but when arm 29 is rotated off normal by the movement of the dial the arm 30 is released and allows spring 212 to rock the shaft 222 and support 117 attached thereto and thus raise the price contact springs 31C (Fig. 4) and penny change contact springs 118C (Fig. 10), which are attached by insulators to support 117, out of the path of the price pins 11 while the drum 8 is rotating.

The return of the stepping arm 15 to normal position (in a counter-clockwise direction) rotates the gear 18 which motion is transmitted via idler gear 19 to the drum gear 20 against the tension of spring 119 on the drum shaft 111 (Fig. 4). Gear 20, cams 21 and 129, ratchet wheels 48 and 49 and the drum 8 (Fig. 6) are all rigdly attached to the shaft 111. As the gear 18 moves off normal the pin 32, which is in supporting engagement with a hook on the pivoted arm 33, releases the arm 33 which drops by its weight down to the ledge 34 on the pivoted elbow 35 (Fig. 4). This rocks the pulsing contact 29C (Fig. 4) which is carried by a support 115 to which arm 33 is attached, but not far enough to be out of engagement with the lobes on the pulsing cam 21 and the rotation of the cam 21 on shaft 111 closes the pulsing contact 29C six times due to the gear ratio between gears 18, 19 and 20; said ratio being such that movement of dial 12 an angular distance equal to that between two adjacent finger holes produces angular travel of 120° in the three lobed cam 21, causing one lobe to engage contact 29C and momentarily close the aforesaid pulsating actuating circuit to magnet 82 on the elevator.

The rotation of shaft 111 rotates the price drum 8 attached to shaft 111, which in turn moves the price belt 7 in direct relation to the circumferential movement of the drum 8 due to the indexing of the pins 201 with holes 202 in the belt 7. The pins 11 on the belt 7 will thus be brought into proper position under the contact springs 31C and 118C for price and penny change selection.

While this is taking place the drum ratchet wheel 48 (Fig. 7) is advanced to the sixth position (two revolutions) by gears 18, 19 and 20 and shaft 111, where it is held by pawl 50 engaging a tooth 191. The pawl 50 engaging a lug 190 on the pawl 46 prevents pawl 46, under tension of spring 135, from engaging the teeth in the ratchet wheel 49 until the pawl 50 has become fully seated in one of the notches 191 in the ratchet wheel 48. By exactly aligning radially each notch 191 with a corresponding peripheral notch of gear 49 and so disposing lug 190 carried by pawl 46 relatively to pawl 50 that pawl 46 cannot engage in its peripheral notch in gear 49 until pawl 50 is fully seated in the corresponding notch 191, it becomes impossible for pawl 46 to seat improperly. This is to insure that the wheel 48 locks in proper position after the first movement of the dial even though there should be some lost motion in the gears. As the dial 12 returns to normal under the tension of the spring 14, (Fig. 5) the tongue 188 pivoted to the arm 29, (Fig. 4) which is rigidly attached to the dial shaft 28, displaces the elbow 35 carrying the shoulder 34 clear of arm 33 and allowing the arm 33 to drop to a position on a stop 194, (Fig. 10) to move the pulsing contact 29C out of engagement with the cam 21 to prevent further pulses in these contacts on the next movement of the dial. The stepping arm 15 on returning to normal position enters the V notch 36 (Fig. 9) which by sliding motion on an edge of the V notch returns it to dead center out of engagement with the hole 9 in gear 18.

The wheel 38, (Fig. 7) is provided with a series of holes 189 angularly spaced, about a circumference in the wheel, distances corresponding to the angular spacings of the finger holes A, B, C, etc., in the dial 12 and the serrated wheel 41 rigidly attached to the same hub as the wheel 38 is provided with a plurality of lobes 267 in its circumference radially alternating with the holes 189. The wheels 38 and 41 are normally held, by the seating of the roller 42 in a space between two lobes, in such a position that any one of the holes 189 will be aligned properly to engage with the wedge 210 on the arm 15 on the second movement of the dial, as explained in the following.

As the dial is rotated in a clockwise direction for the second digit of the code of the selected article (the code FD being assumed for an example) the free end of the stepping arm 15, the arm 15 rotating with the dial as previously explained, engages the raised edge 37 (Fig. 9) on a branch of the pivoted arm 33, which is now held in its middle position by the ledge 34 (Fig. 4), and by a sliding motion on the edge 37 the arm 15 is moved off its dead center toward the wheel 38. The spring 17 causes the wedge 210 on the arm 15 to engage the fourth hole 189 in wheel 38 beyond the starting position of the arm as the dial returns to normal under the power of the spring 14. This rotates the wheels 38 and 41 counterclockwise an angular distance corresponding to the angular displacement of the dial.

The roller 42 (Fig. 7) engaging the lobes on the serrated wheel 41 imparts a reciprocating motion to the arm 43 on the shaft 125 the roller 42 on arm 43 being normally held against the wheel 41 by the tension of the lower spring of the contact 49C against the lug 40 on the lower end of the arm 43. The pawl 44 off set so that the lower end of it engages stop pin 47 as shown in Fig. 6, and shown dotted in Fig. 7, is normally held out of engagement with the ratchet wheel 49 by stop pin 47 against the tension of spring 45 and as the arm 43 is rocked, the pawl 44 moves free of the stop 47 and the spring 45 causes the pawl 44 to engage a tooth of the ratchet wheel 49, continued travel of the arm 43 causing a one step movement of the ratchet wheel 49 for each lobe of the wheel 41 that passes under the roller 42. The wheel 49 is thus advanced four steps, moving with it the drum 8, return movement being prevented by pawl 46. While this is taking place four closures of the contact 49C by the lower arm of the part 43 causes four circuit closures (Fig. 28) to energize the solenoid magnet 227 of the cycle control device shown in Fig. 15 four times.

A series of pins 201 (Fig. 5) is provided on drum 8 which index with holes 202 in the edges of the price belt 7 so that the aforesaid movement of the ratchet wheel 49, which also rotates the drum 8 on shaft 11, definitely positions the price belt 7 to bring the row of holes 10 corresponding to the dialed number directly underneath the insulator lugs on the price and penny change contact springs 31C and 118C. As the dial returns to normal under the tension of spring 14 the dial control arm 29 (Fig. 4) engages the arm 30 causing it to rock this arm clockwise and to correspondingly rock the shaft 222 (Fig. 5) against the tension of spring 212 through the medium of the links 116. This movement of shaft 222 also rocks the price contact support 117, which is attached to shaft 222, causing the ends of springs 31C and 118C to be moved toward the price belt 7 as indicated in Fig. 4. Since, as previously explained, there will be a pin 11 underneath one of the ten price contact springs 31C the corresponding contact 31C will be closed by the engagement of its insulator lug with the pin 11, and if any penny change is involved in the price of the selected article, there will be a pin 11 underneath one of the four penny change contact springs 118C so that the corresponding contact 118C will also be closed by engagement with this pin 11. To cover the proper relationship of the contacts 31C and 118C as shown in Fig. 28 with the price pins 11 it is to be understood that contacts 31C and 118C are numbered from top to bottom in Fig. 28.

The price belt 7 on drums 8 and 175 and a supply of pins 11, to be placed in the proper hole, or holes in each row 10 in this belt, together with the series of ten price contact springs 31C and the series of four penny change contact springs 118C, including the mechanism for positioning the belt simultaneously with the selection of an article by the operation of the dial, constitute what may be referred to as the price setter.

Any further movement of the dial, after its operation for two digits has been completed, will be ineffective since the arm 15, having been returned to its dead center by engagement with an edge of the V notch 36 (Fig. 9), and the branch of the arm 33 having dropped out of engagement with the end of arm 15 (Fig. 4), the arm 15 will remain in dead center by frictional contact of a tit 268 on support 121 (Fig. 7) seating in a small indentation in arm 15 so that the arm 15 will not cause any further gear movement even though the dial should be rotated.

A lobe on cam 129 is shown in Fig. 28 in engagement with an insulator holding contacts 36C, 37C and 38C open and holding contact 35C closed. This represents the normal condition of the article selector unit and these contacts are referred to as the article selector normal contacts. This spring pile up is attached by suitable insulators to support 128 (Figs. 4 and 5) which in turn is attached to shaft 125 adapted to turn in bearings in the frame at either end. The arm 33 and the support 115 carrying the pulsing contact 29C, previously explained, are also attached to shaft 125. The dropping of the arm 33 to its middle position with its end resting on ledge 34, after the operation of the dial for the first digit, raises these normal contacts from the engagement with the lobe on cam 129 closing contacts 36C, 37C and 38C and opening contact 35C. This is referred to as the actuated position of these contacts (Fig. 28 representing the normal position of them). The normal contacts will remain in the actuated position until the mechanism of the article selector unit is completely restored to normal with arm 33 and cam 129 both in normal position as will be explained. The functions of these contacts will be explained in connection with the operation of the machine.

A magnet 112 (Fig. 11) is provided adapted to cause the restoral of the article selector and price setter unit to normal near the end of a cycle of operation of the machine. The T shaped dial release rocker 114 is partially shown in Figs. 5, 6, 7 and 10 in relation to the associated mechanism being partially cut away and the magnet 112 omitted for clarity of the drawings. The operation of magnet 112, moving its plunger against the compression of its restoring spring 200, actuates the rocker 114 on shaft 249 and a lug 248 on the rocker 114 rocks the pawls 46 and 50 (Fig. 7) on the shaft 249, releasing the ratchet wheels 48 and 49, allowing the spring 119 (Fig. 6) to rotate the price drum 8 and the associated gears 18, 19 and 20 to normal position and the engagement of pin 32, on gear 18, with arm 33 raises the arm 33 to normal position. At the same time a link 113, attached to the rocker 114, imparts a movement via toggle links 116 to the arm 120, fast on shaft 222, to rock the shaft 222 against the torsion of spring 212, in turn rocking the support 117, also attached to shaft 222, to raise the price contact springs 31C and the penny change contact springs 118C out of the path of the price pins 11 as the price drum 8 and belt 7 return to normal under the power of the spring 119.

A drum lock 124 is attached to the support 115 and when the arm 33, attached to support 115, is raised by the restoral of gear 18 the drum lock 124 is brought into engagement with a pin 126 on ratchet wheel 48 (Fig. 7) on shaft 111 to stop the drum 8 exactly at its normal position. The cam 129 on shaft 111 will then be in normal position and the raising of arm 33 and the consequent rocking of the shaft 125, the support 128 and the off normal contacts thereon will cause these contact springs to engage the lobe on cam 129 restoring the off normal contacts to normal position as shown in Fig. 28. This rocking of the shaft 125 and the support 115 also moves the lug on contact spring 29C on support 115 into inoperative position between two of the lobes on cam 21.

Coin control unit

A coin control unit (Figs. 24, 25 and 26) is provided comprising means to totalize the value of various denominations of coins deposited therein, to close a circuit to start the driving motor when sufficient coins are inserted, to complete in part a circuit to control the delivery of nickels in change, to cause the collect or refund of the deposited coins and to open or close circuits as required to interconnect the other units of the machine in proper sequence. This unit includes relays and miscellaneous electrical apparatus of standard manufacture together with a collect and refund mechanism shown in the broken line enclosure 302 (Fig. 28) and a coin totalizer, the circuits and symbols of mechanical parts of the totalizer being shown in the broken line enclosures 52 and 54 (Fig. 28). All of the apparatus of the coin control unit is mounted on the door 278. This door is hinged to the cabinet so it can be opened to provide for ready access to the associated mechanism and also to provide access to the change storage channels to permit stocking them with change coins.

A stepping relay indicated as a whole by a box 52 in Figs. 24 and 25 and shown in symbolic form in the enclosure 52 in Fig. 28, is a unit piece of apparatus well known in the electrical art and therefore will not be described in mechanical detail. It is so designed that its contact arm is advanced one step each time its stepping magnet 53 is energized and released and remains mechanically locked in the operated position until the release magnet 136 is energized which restores the stepping relay to normal position as shown in Fig. 28. The contacts 13C and 14C close and the contact 12C opens on the first step and remain in this position until the relay is released. These are referred to as the stepping relay normal contacts this representing the actuated position of these contacts. The normal position is as shown in Fig. 28. It is to be understood that when alternating current is employed it is expected that solenoid type magnets will be required for the proper operation of the stepping relay. An indicator may be provided on the shaft of the stepping relay and made visible to the customer adjacent to a suitable calibrated scale, as shown symbolically in Fig. 28, to indicate the number of five cent units of money that have been inserted as explained later. The stepping relay will be referred to as a whole hereinafter by the numeral 52.

The coin totalizer comprises a series of five contacts 9C, two contacts 10C and one contact 11C adapted to be actuated by the passage of coins in the coin channels 269', 270' and 271' (Fig. 24) together with the stepping relay 52. The upper coin channel structure 296 is attached at its upper end to the door 278 and is attached near its lower end to the door 278 by a support 279 at either side. One of the supports 279 is shown in Figs. 5 and 25. The lower coin channel structure 281, made of insulating material, is attached at its upper end to the structure 296 by means of lugs 298 and at its lower end to the upward extended rear wall 297 of the coin box 185 which in turn is attached to the lower end of the door 278. In Fig. 24, coin channels are shown passing from the coin entrances 269, 270 and 271 directly into the coin channels 269', 270' and 271' respectively but it is to be understood that suitable slug detectors may be inserted at this point to eject spurious coins so that only genuine coins will reach the channels 269', 270' and 271'.

In Fig. 24 is shown a weighted, pivoted lever 280 having one end extending through an arcuate slot in the coin channel structure 281 and adapted to be rocked by the passage of a coin, closing an electric contact 9C, and being returned to normal position by a weight 290. Five such levers are associated with the quarter channel 271' adapted to be successively operated in the slots shown, each lever operating a contact 9C. Two such levers 288 with weights 291 are associated with the dime channel 270' to successively operate two contacts 10C and one lever 289 and weight 292 with the nickel channel 269' to operate contact 11C. There are as many contacts associated with each coin channel as there are five cent units of value in the coin which that particular channel is arranged to accommodate. Each circuit closure of a contact 9C, 10C or 11C actuates the stepping relay from G" through one of the contacts 9C, 10C or 11C, contact 19C of relay 55 and through the stepping magnet 53 of the stepping relay 52 to ± to advance the stepping arm of the stepping relay one step therefore each step corresponds to a five cent unit of value in the coins deposited.

When coins of sufficient value have been deposited to equal the price of a selected article the contact arm of the stepping relay 52 (Fig. 28) will have been stepped to a contact that is electrically connected to the particular contact 31C of the price setter that has been closed by the operation of the dial in selecting the article as previously explained. This will complete a circuit to operate relay 55 to start the operation of the machine as explained later.

A coin receptacle 162 (Fig. 25) is provided, in which the deposited coins are retained after passing through the channels 269', 270' and 271' (Fig. 24); and a receptacle 161 is provided, in which the change coins delivered from the change delivery unit, described later, through the change guide 160 (Fig. 24), are retained. The coins retained in these receptacles rest on two sloping traps 163 and 176 (Fig. 24). As shown in Fig. 25, the trap 176 contains two sections both of which are attached to shaft 183 which is free to turn in bearings in walls 297 and 300. One section of trap 176 extends across channel 161 and the other across the channel 162. An arm 178 (Fig. 24) on shaft 183 is attached by pivot to a link 177 the lower end of which is pivoted to the upper end of a toggle link 179 the lower end of this toggle link being supported on a pivot 180 attached to wall 297. The off set central point in the link 179 is pivoted to the plunger of the collect magnet 181 (Fig. 24). The trap 163 is identical in construction to the trap 176 and connected by similar linkage to the refund magnet 168. Thus the refund arm 165 corresponds to the collect arm 178, link 164 corresponds to 177, toggle link 166 corresponds to 179 and supporting pivot 167 corresponds to 180.

The operation of the collect magnet 181, which if merchandise is delivered occurs near the end of a cycle of operation of the machine as explained later, rocks the toggle link 179 about the pivot 180 which, interacting through the link 177, rocks the collect arm 178 rocking the shaft 183 which lowers both sections of the trap 176. The coins in the receptacle 162 are released by this trap and pass through the collect chute 174 into the coin box 185. The change coins in the receptacle 161, which are also released by the trap 176, pass into the change chute 173 and into the refund box 184. The spring 182 serves to return the trap 176 to normal position.

A short time after the time of operation of the collect magnet, and before the end of the cycle of operation of the machine, the refund magnet 168 operates as explained later. This magnet, through the medium of the interacting parts 164, 165 and 166, serves to lower the trap 163, which is then restored by the spring 169, but if the collect magnet had previously operated this would perform no useful function since the coins would be out of the receptacles at this time. However, if no merchandise had been delivered the collect magnet would not have operated. In this case the lowering of the trap 163 releases the coins in the receptacle 162 which pass through the refund chute 171 over the sloping surface 186, which deflects the coins from behind the wall of the chute 172 into the refund box 184 and releases the change coins in the receptacle 161 which pass through the chute 172 into the coin box 185. It will be noted from the above operation that when an article is delivered the inserted coins are collected and at the same time the change coins are delivered to the customer and that when an article of merchandise is not delivered the inserted coins are refunded and any change coins that have been delivered into the change receptacle are passed into the coin box.

*Change delivery unit*

A change delivery unit adapted to accommodate pennies and nickels is shown as a part of Fig. 24 and shown also in Fig. 27. The penny change delivery unit comprises a penny storage channel 159', a delivery finger 152' adapted to to slide by gravity along a shaft 153' parallel to said storage channel, said finger normally resting on the upper coin in the channel, a magnet 149 to rock said shaft for actuating the delivery finger to deliver the upper coin in the channel and a lug 196' on said finger adapted to actuate an electric contact 28C when the penny change coins are down to a predetermined point in the channel.

A nickel change delivery unit is also provided as shown in the same figures (Figs. 24 and 27) alongside of the penny change unit, the numbers for designating the various parts for the nickel change unit being the same and the parts operate in the same way as the corresponding parts of the penny change unit except being distinguished by omitting the prime (') symbol on the reference numeral. For example, the delivery finger for the penny change unit is designated 152' and for the nickel change unit is designated 152.

The nickel and penny change channels 159 and 159' (Fig. 24) together with the change guide 160 are preferably made in one casting. The upper end of the casting is attached by an arm 299 to the upper coin channel structure 296 and the lower end is attached to and supported by the front wall 300 of the change receptacle 161 attached to the floor of the refund box 184 which in turn is attached to the door 278.

When the penny change magnet 149 is energized a finger 273' on the plunger 192' of the magnet 149, rocking the arm 155', rotates the shaft 153', to which the arm 155' is attached. The delivery finger 152', having a semi-circular section with one end resting on top of the column of the five cent coins, and a frame with upper and lower plates, each having a notched hole by which it is supported on the shaft 153, said frame and plates constituting a rockable U bracket with the delivery finger 152 attached thereto, is adapted to slide by gravity along the shaft 153, and adapted to rock with the shaft due to the key 154, which engages the notches in the holes of the upper and lower plates. The rocking of the shaft 153, by the magnet 148, causes the semi-circular end of the finger 152 to pass over the center of the column of coins and the offset edge 158 (of slightly less offset than the thickness of a coin) of the finger 152 engages the uppermost coin, pushing it off of the column into the channel 159, thence through the change guide 160, into the change receptacle 161. When the magnet is deenergized the plunger 192', the arm 273', the shaft 153' and the delivery finger 152' are all restored to normal position by the action of the spring 150' and delivery finger 152' slides by gravity down the shaft 153' the thickness of a coin and the finger comes to rest on the upper coin in the channel. Thus each time the magnet 149 is energized and released a penny is delivered into the change receptacle 161. In the same manner, each time the magnet 148 is energized and released, a nickel is delivered into the change receptacle 161. The change coins are held in the receptacle 161 until disposed of near the end of a cycle of operation of the machine as explained later.

It will be noted that when a quarter is deposited in the machine there may be as many as four nickels required for change and on a transaction requiring pennies change there may be as many as four pennies required for change. An arm 196' is provided on the penny change delivery finger 152' and an insulator 197' provided on the moving spring of contact 28C, the insulator 197' being so positioned relative to the arm 196' that when there are only three pennies in the channel (which is one less than the maximum that may be required) the arm 196' will engage the insulator 197' when the finger 152' is rocked by the magnet 149 closing contact 28C causing the operation of relay 56 which in turn prevents the delivery of merchandise and causes the refunding of the deposited coins to the customer as explained later. The position of arm 196' relative to insulator 197' to cause the operation of contact 28C is shown symbolically in Fig. 28. An arm 196 is also provided on finger 152 in the nickel change unit to similarly engage an insulator 197 to close contact 27C when there are only three nickels in the channel. The relative positions of arm 196 and insulator 197, as shown symbolically in Fig. 28, are such that contact 27C will not close when the nickel change unit is operated since this illustration shows more than three coins in the column of coins. Contact 27C performs the same function as contact 28C.

Typical operations of the completely assembled machine will now be described covering in detail the electrical connections (Fig. 28) between the units in proper sequence but referring only to the general functions of the units themselves the mechanical details of the units having been previously described.

Assume, for example, an article in channel *f* on shelf D (which would have the code FD) at price forty cents is to be selected and a quarter, a dime and a nickel are to be deposited. The price setter will have been previously prepared by placing a pin 11 in the eighth hole of the series of holes 10' in the row of holes 10 corresponding to the channel from which the article is to be vended, but since no penny change will be required on this transaction no price pin 11 will have been inserted in any of the holes 10".

In operating the machine a customer first determines the code of the article desired and its price by viewing the samples in the display space 193. Referring to Fig. 28, which shows all electric contacts in normal or unoperated positions, it will be noted that a circuit is closed from ± through contacts 30C, 46C, 35C, 12C and 48C and through the white lamp 208 to G" lighting the white lamp. This is for the purpose of indicating to the customer that the machine is in normal condition ready for operation. The customer is instructed that if this lamp is not lighted (which would be the case if some person has out of curiosity moved the dial since the last operation of the machine) he should press the button 145. This completes a circuit from ± through contacts 46C and 8C and through the winding of relay 56 to G" operating relay 56 which in turn causes any parts of the machine that may be in operated position to be restored to normal in the same manner as is done when relay 56 operates near the end of the regular cycle of operation. The details of this restoring operation will be described in its proper sequence in the typical example of operation now to be described.

When the customer dials the first digit (F) of the code of the article the article selector unit causes six pulses of the contact 29C each pulse closing a circuit momentarily from G" through contact 29C and magnet 82 to ± causing the elevator mechanism to be stepped six steps in preparation for later causing the release of an article from a channel (f). At the same time the operation of the dial partially positions the price belt 7 in the article selector unit for price setting. When he dials the second digit (D) of the code, the article selector unit causes four pulses of the contact 49C each pulse closing a circuit momentarily from ± through contacts 49C and magnet 227 of the cycle control unit causing the cycle control unit mechanism to be stepped four steps in preparation for later closing a circuit to the elevator at the proper time for causing the release of an article from the shelf D'. At the same time the operation of the dial definitely positions the price belt 7 in the article selector and price setter unit to determine the amount of money that must be inserted before the machine will start and to determine the amount of penny change that will be delivered where such change is required. Since a price pin 11 has been placed in the eighth hole of the series 10' (Fig. 5) of the row of holes 10 in the price belt 7 corresponding to the selected article the eighth contact 31C (counting from top to bottom in Fig. 28) will now be closed: also since the article selector unit 51 (Fig. 28) and the elevator mechanism 195 have been operated by the movement of the dial their normal springs will now be actuated and a circuit will be closed from ± through contacts 33C, 38C and 26C and through the green lamp 209 to G" lighting the lamp 209 as an indication to the customer that the mechanism has been operated in readiness for the insertion of coins.

Assume a quarter is now inserted in coin entrance 271. In passing through the channel 271' it will cause a series of five contacts 9C to be closed successively thereby closing and opening a circuit five times from G" through successive contacts 9C and through contact 19C and magnet 53 of the stepping relay 52 to ± causing the stepping relay to make five steps. Similarly when a dime is inserted in the entrance 270 and passes down the channel 270' it causes two contacts 10C to be closed successively causing the circuit to be closed twice to the magnet 53 and the stepping relay makes two additional steps. A nickel in channel 269 causes one circuit closure at contact 11C and in a similar manner advances the stepping relay one additional step making a total of eight steps each step representing a five cent unit of value in the coins inserted or a total of forty cent.

Since the eighth contact 31C of the price setter was closed by the operation of the dial the advancement of the stepping relay arm to its eighth step will close a circuit from G" through the eighth contact 31C over the line designated 40 in Fig. 28 then through the eighth contact on the stepping relay to the relay arm thence through contacts 16C, 21C and relay 55 to ± operating relay 55. This relay will lock through contacts 21C and 17C to G". Relay 55 operated will close a circuit from G" through contacts 43C and 20C and through the motor 71 to ± operating the motor in a direction to move the elevator 195 downward.

As has been explained (under cycle control unit) the pulley 73, the cams 139, 140, 141, 142, 143 and 144 and the drum 240, all on shaft 241 shown symbolically in Fig. 28, are adapted to make approximately one revolution in the direction of the full line arrow in synchronism with the downward movement of the elevator and to rotate back to normal position in the direction of the dotted arrow in synchronism with the return upward movement of the elevator.

The toggle link 86, attached to the shaft 87 (Fig. 17), is normally held in downward position by its interaction with link 85 during the downward movement of the elevator, therefore the position of the shaft 87 is such that the contact springs 1C, 2C, 3C and 4C attached thereto will be actuated by the lobes (Fig. 28) on the cams 140, 141, 142 and 143 respectively, but the ends of the contact springs 5C will be clear of the cam 144; and the contact springs 42C, 43C and 50C also attached to shaft 87 will be held in the position shown in Figs. 17 and 28 (the contact 42C being obscured by contact 1C in Fig. 17) since the ends of these springs are engaged by a lug attached to the frame of the cycle control device. The contacts 1C, 2C, 3C and 4C perform no useful function except when an associated contact 118C is closed by a price pin 11 in one of the holes 10" for delivery of pennies change and since no pennies change is involved in the transaction now being described none of the contacts 118C will be closed.

Near the beginning of the downward movement of the elevator the cam 139 causes the operation of the relay control contact 44C to hold the relay 55 operated which in turn holds the motor circuit closed during the downward movement of the elevator. Just before the upper edge of the elevator reaches a point opposite the shelf on which the selected article is stored (in this case D') the lug 247 on the contact spring 41C (Fig. 15) will effect the closure of a circuit from G" through the eighth contact 31C, eighth contact of stepping relay 52, contacts 50C, 41C and 25C and the delivery magnet 76 to ±. This will cause an article to be released from channel f of shelf D' which will fall into the delivery pan of the elevator and be delivered to the customer. When the elevator reaches its lowest point the link 86 moves upward opening contacts 43C and 50C and closing contact 42C. The closure of the motor circuit through 42C instead of 43C reverses the motor and the elevator moves upward.

The delivery of the article from the elevator on its upward movement causes the closure of contact 34C which completes a circuit from ± through contact 34C and collect magnet 181 to cause the collection of the deposited coins. At a point in the cycle immediately following the delivery of the article from the elevator the cam 139 releases the control contact 44C in turn releasing the relay 55 which performs no useful function at this time. Next the contacts 5C and 6C, which are rocked into engagement with cam 144 by shaft 87 (Fig. 15) on the upward movement of the elevator, are closed momentarily by a lobe on cam 144. This completes a circuit from ± through contacts 5C, 6C and refund magnet 168 to G''. Thus, in case no article is delivered to cause closure of collect contact 34C to operate the collect magnet for collecting deposited coins, the operation of the refund magnet disposes of the coins held in the coin receptacles by refunding the deposited coins.

The closure of contacts 5C and 6C by the cam 144 also closes a circuit from ± through contact 5C and relay 56 to G'' operating relay 56. This closes a contact 23C for the purpose of restoring the mechanisms to normal and the relay locks through its own contact 22C until the normal contacts 14C, 37C, 56C and 32C of the various units are all restored to normal by the restoral of the mechanisms of these units to normal as will be explained. It will be noted that the normal contacts of the stepping relay, article selector, cycle control unit and elevator are all in actuated positions at this time since these mechanisms are off normal and they will be restored in the order named.

First a circuit is closed from ± through contacts 23C and 13C and through magnet 136 to G'' energizing the magnet 136 which restores the stepping relay and its normal contacts to normal positions. The restoring circuit then passes from ± through contacts 23C, 12C and 36C and through magnet 112 to G'' energizing magnet 112 which causes the restoral of the mechanism of the article selector unit and its normal springs to normal positions as has been explained. The restoring circuit now passes from ± through contacts 23C, 12C, 35C and 47C and through magnet 228 to G'' energizing magnet 228 which restores the rack 229 and the associated normal springs of the cycle control unit to normal positions. At about the same time the elevator 195 reaches its normal position at the upper limit of its travel where the shaft 87 is rocked to move the link 86 downward opening contact 42C and closing contacts 43C and 50C. Contact 42C opens the circuit to the motor 71 since relay 55 has previously released and the elevator comes to rest at the upper limit of its travel. After the restoral of the normal springs of the cycle control unit the restoring circuit passes from ± through contacts 23C, 12C, 35C, 48C and 31C and through magnet 83 to G'' energizing magnet 83 which restores the elevator mechanism and its normal springs to normal positions.

It will be noted that the normal contacts 14C on the stepping relay, 37C on the article selector, 56C on the cycle control unit and 32C on the elevator are now all open removing ± from the spring of contact 22C which was holding relay 56 locked and this relay now releases. A circuit is then extended from ± through contacts 30C, 48C, 35C, 12C, 24C and the white lamp 208 to G'' indicating that all parts of the mechanism are again restored ready for another operation. It will be noted from the above description that the mechanism of any one unit must be completely restored before the restoring circuit is extended to the next unit in the sequence and they must all be restored before the relay 56 is released to open the restoring contact 23C. It will be noted also that the relay 56 as well as all four of the units must be normal before the circuit to light the white lamp is completed.

A refund and restore button 145 is provided to enable a customer, at any time prior to the time the machine starts, to effect the refund of any money inserted by closing a circuit from ± through contacts 46C, 45C and 7C to the refund magnet 168. The operation of the button 145 also closes a circuit from ± through contacts 46C and 8C simultaneously with the closure of the circuit through 46C, 45C and 7C, to operate the relay 56 which, if any of the contacts 32C, 37C, 56C or 14C are in off normal position, locks through contact 22C and closes the circuit through contact 23C to restore any of the price selector, shelf selector, dial or elevator mechanisms that may be operated, as previously explained. The relay 56 also opens the circuit at contact 25C to the delivery magnet 76 so that no package will be delivered if the machine should complete a cycle of motion after the refund button has been operated. The refund button is rendered ineffective by the opening of the circuits by the contacts 45C and 46C associated with the cam 139, as soon after the machine has started as practicable, allowing for some variations in the point where the cam 139 comes to rest after each operation. It may happen that some person may move the dial without completing the operation of the machine. In this case some part of the dial shelf selection or elevator mechanism may be operated and the associated contacts would be off normal, therefore the white lamp would not be lighted. The customer is instructed to operate the refund button and wait until the white lamp lights before dialing.

In order to illustrate the change making features of the machine, assume now that an article in channel e of shelf C' (code EC) having a price of twelve cents is to be selected, and that two dimes are to be inserted. A price pin 11 will have been placed in the third hole of the row of holes 10' corresponding to the code of the article to be selected, and a pin 11 will have been placed in the third hole 10'' in the same row of holes 10. The dial 12 will be operated and the mechanism will function in the manner previously explained except that the first operation of the dial will cause one and two-thirds revolutions of the price drum 8 and be locked in that position by the pawl 50 in the notch 191 in the ratchet wheel 48, the pulsing cam 21 will effect five successive closures of the circuit at contact 29C to the elevator stepping magnet 82 which will cause the ratchet wheel 25 to be advanced five steps and be locked in that position by the pawl 27 and the second operation of the dial will advance the ratchet wheel 38 and the wheel 41, causing three reciprocal movements of the arm 43 by means of the passage of three lobes on the wheel 41 under the roller 42 on the arm 43. This will cause the drum ratchet wheel 49 to be advanced three steps beyond the point where it stopped on the first movement of the dial, where it will be held by pawl 46 and will cause three circuit closures of the contact 49C by the lug 40 on the arm 43 to energize the magnet 227 three times to cause the rack 229 (Fig. 15) to be advanced three steps where it will be held by the lug 231 engaging in the locking rack 230.

Next, after the green lamp lights to indicate that the selection has been made, as previously explained a dime is inserted in coin entrance 270, which engages levers in the dime coin channel actuating contacts 10C to effect two closures of the circuit to the price selector stepping magnet 53, advancing this selector two steps. The passage of the second dime down the coin channel similarly causes two circuit closures, the first closure advancing the price selector one additional step to its third contact, and since there is a price pin in the third hole in the price selection belt 7 the corresponding price contact spring 31 will have its contact closed and a circuit will be completed from G" through the third price contact, the third contact of the price selector, contact 16C and contact 21C, to operate the relay 55. This relay locks electrically through its own contact 17C and a contact 21C on relay 56. It closes a circuit from G" through contacts 43C and 20C to the motor 71 to start the cycle of motion, and at the same time opens the circuit at contact 19C to the stepping magnet 53 and closes the circuit through contact 18C to contact 39C of relay 57 and the stepping magnet does not operate again; therefore, the price selector 52 remains on its third contact. This operation closes a circuit from ± through contact 15C to relay 57 but the relay 57 does not operate at this instant, since it is short circuited by the contact 10C in the coin channel and its own contact 40C, but as soon as the contact 10C opens after the passage of the coin, the relay 57 operates through the resistance 250. The next closure of the contact 10C closes a circuit from G" through contacts 18C and 39C to operate the five cent change magnet 148 which delivers one nickel into the change receptacle 161.

During the downward movement of the elevator the cams 140, 141, 142 and 143, operating in synchronism therewith, actuate the penny change contacts 1C, 2C, 3C and 4C one, two, three and four times respectively, consequently one, two, three or four circuit closures will be made to the penny change magnet 149 if the first, second, third or fourth of the contacts 118 has been closed by a price pin 11. Since there is a price pin 11 in the third hole of the row 10" in the price belt 7, which belt has been previously moved into a position corresponding to the article selection, as previously explained, a circuit will be closed through the contacts 3C and the third of the contacts 118C to cause three circuit closures to the penny change magnet 149, causing three pennies to be delivered into the change receptacle 161.

The machine completes the above series of operations in all respects as in the first example and in addition, as explained above, three pennies change and one nickel change were caused to be delivered into the change receptacle 161. The operation of the collect magnet 181, which takes place if an article is delivered, causes the deposited coins to be passed into the coin box 185 and the change coins to be passed into the refund box 184 where they are accessible to the customer. If an article is not delivered the collect magnet does not operate and the subsequent operation of the refund magnet 168 causes the deposited coins to be passed into the refund box accessible to the customer and the change coins in the receptacle 161 to be passed into the coin box 185.

Either the operation of the refund button or the automatic refund contacts 5C and 6C at cam 144 will, in addition to operating the refund magnet, also close a circuit to relay 56, causing it to operate and lock through its contact 22C and effect the release of the mechanism as previously described, thus, preparing the machine for repetition of the above operations preliminary to stopping the machine by the opening of the motor circuit at contact 42C.

If there are not enough pennies in the penny change channel or enough nickels in the five cent change channel to deliver the full amount of change required on any transaction, the machine will complete a cycle of motion that has been started and will not deliver the merchandise but will automatically refund the deposited coins in the following manner.

As the penny change coins are delivered from the top of the column the finger 152', the circular arm of which rests on the top of the column, moves by gravity down the shaft 153' a distance equal to the thickness of a coin, after each coin is delivered, and is so positioned with respect to the contact arm 197' that when it reaches the point where there are only three pennies in the channel (less than the maximum number that might be required on a transaction), the arm 196' extending downward from the finger 152', engages an arm 197' on the contact spring 28C, closing a circuit to operate the relay 56. The operation of relay 56 opens the circuit at contact 25C to the delivery magnet 76 to prevent the delivery of merchandise and at the same time closes the circuit at contact 23C to restore the price selector, the dial mechanism, the shelf selector and the elevator mechanism, as previously explained. As the cycle of operation continues the cam 144 closes the automatic refund contacts 5C and 6C near the end of the cycle, refunding the deposited coins and depositing into the coin box 185 any change coins that have been delivered into the change receptacle 161.

The cams 140, 141, 142 and 143 are so timed with respect to the elevator 195 that on any transaction involving penny change at least one operation of the penny change device takes place before any merchandise is delivered. This is to prevent the possibility of having contact 28C close, causing the deposited coins to be refunded after a package has been delivered when there may not be as many pennies in the change channel as are required for the transaction. The device is arranged so that there are at least three pennies in the channel 159' at the time the arm 196' first engages the arm 197' on the penny change contact so that if a package is delivered from an upper shelf after the first operation of the contact spring 28C, there can be three additional pennies or a total of four pennies delivered and the transaction will be completed with proper change even though the contact spring 28C later makes several closures of the circuit to the restoring relay 56. It will be noted that with this arrangement any transaction not requiring pennies change will be completed even though the penny change coins are exhausted, since in this case the contact 28C will not be operated.

A contact 27C is provided on the five cent change channel which performs the same function in connection with transactions involving nickels change, as contact 28C does in transactions involving pennies change, except that the five cent change device operates to deliver the change coins into the change receptacle 161 as soon as the last coin is inserted into the machine and this takes place before the elevator reaches a point to deliver merchandise. The five cent change device is arranged the same as the one cent change device so that, when the arm 196 first engages the arm 197 to operate the five cent change contact 27C, there will be at least four nickels in the change channel which is the maximum number required for any one transaction in a machine where a quarter is the largest denomination of the coins employed, insuring that the full number of nickels required for the transaction will be delivered. The machine completes its cycle of motion in the same manner as when no package is delivered and near the end of the cycle of motion a contact 6C closes a circuit to refund deposited coins and release into the coin box any change coins delivered, as previously explained. Transactions not requiring nickels change will be completed even though there are no nickels in the five cent change channel, since the nickels change mechanism will not be operated and, therefore, the contact 27C will not be closed to operate relay 56 which, if operated, would open contact 25C rendering the actuating circuit of the article delivery mechanism ineffective.

The dial illustrated in the drawings contains fourteen holes and may make from one to fourteen steps on its first operation to make a selection from any one of fourteen channels on a shelf, and may make from one to fourteen steps on the second operation to make a selection from any one of fourteen shelves. With the actual construction shown in Fig. 22, somewhat less than fourteen shelf selections could be made and twelve shelves are shown in the drawings for convenience. The reason for this limitation is that if the cylinder 24 in Fig. 22 is rotated too far the lug 147 might be moved far enough to interfere with the proper operation of the contact spring structure.

The particular stepping relay 52 shown in the drawings contains ten steps, each representing a five cent unit of money inserted. There are a plurality of rows of holes 10, each containing fourteen holes in the price belt 7, ten holes for price selection and four holes for penny change, so that any article can be set to be vended for any price from 1 cent to 50 cents. The two holes 10'' in each row 10 (Fig. 5) may be provided for an optional feature described later.

Three coin channels are shown in Fig. 24, one for nickels containing one contact lever, one channel for dimes containing two contact levers, and one channel for quarters containing five contact levers. Coins may be inserted in any of these denominations and in any order and will cause the price selector 52 to step once for each five cent unit. When the price selector is stepped to the point corresponding to the price of the article, as determined by the setting of the price pin 11, the relay 55 will operate and subsequently the relay 57, as explained, so that any five cent units credited thereafter will result in the operation of the five cent change magnet in preparation for refunding this amount in change along with the pennies delivered in change as determined by the setting of the penny change pin 11. It is to be understood that any of these elements such as the number of shelves, number of channels on a shelf, number and arrangement of coin channels, price range, etc., may be varied as desired within reasonable limits of mechanical design.

Where it is desired to carry a larger stock of certain of the faster selling articles than can be stored in only one of the storage channels, provision may be made to use two or three channels for the same article and to have the machine automatically deliver the articles from these channels in rotation until all of the channels are empty. This is accomplished by means of contacts 51C, 52C and 53C actuated by the drum 240 and a shelf rotation wheel 253 and associated contact structure shown enlarged in Fig. 14 and shown also in normal size in operative relation to the price drum 8 in Figs. 8 and 10. The wheel 253 is adapted to rotate on a pivot attached to a support 257 but with sufficient friction to keep the wheel from rotating when not subjected to outside force. This wheel is in the form of a ratchet wheel having a number of teeth which is a multiple of the number of channels to be used for the same class of merchandise, which is three channels in the case illustrated in Fig. 14, the wheel having six teeth. In radial alignment with one tooth is a pin 254 and in radial alignment with an adjacent tooth is another pin 254 at slightly greater distance from the center of the wheel than the pin in the preceding position, but no pin is associated with the following adjacent tooth. The other three teeth are similarly arranged, with or without the pin, in the same relative order the distances of the pins from the center being such as to close or not to close the contacts 54C or 55C when the ends of these contact springs are moved toward the wheel by the operation of the magnet 256, Fig. 8, when the machine operates, as explained in the following:

Assume that an equal number of a class of articles to be vended is stored in each of three channels, one directly above the other, that one of the units as shown in Fig. 14 is attached to the price belt 7 in the holes 10''' of the row of holes 10 corresponding to the uppermost of these channels, that price pins 11 have been placed in this same row of holes 10 for any desired price setting, and that the dial 12 is operated to select the uppermost of these three channels and money is inserted at the coin entrances equal to or greater than the price of the article. The machine will operate and complete its cycle of motion including the change making operations in all respects as previously explained, except for the following additional operations affecting the shelf selection mechanism. When the support 117, Fig. 10, is rocked by the engagement of the arm 29 with the arm 30, Fig. 4, to move contact springs 31 and 118 toward the price pins 11 on drum 8, the contact 102, Figs. 10 and 14, also attached to support 117 is closed by engagement with a lug on the support 257. This closes a circuit from ± through contact 51C and through the winding of magnet 256, Fig. 8, and contact 43C to G'', the contact 51C being closed by engagement with a lug 252 on the drum 240, Fig. 15, during that part of the cycle that precedes the time when the elevator reaches a point where a package can be delivered. The operation of the magnet 256 rocks the support 259 on the shaft 222, which in turn, due to the tension of the spring 261, rocks the locking arm 255 causing a tongue on this arm to engage one of the notches 258 in the periphery of one end of the drum 8 for the purpose of preventing this drum from releasing while the magnet 256 is operated. Continued movement of the support 259 by the magnet 256 moves an arm 260 attached thereto, yieldingly into engagement with a tooth in the ratchet wheel 253, Fig. 14, rotating this wheel until the arm 260 is stopped by a lug on the support 257, which movement is an angular distance of one tooth, and the contact springs 54C and 55C also on support 259 are moved toward the wheel 253 for a purpose to be explained later. The support 259 and arm 255 are restored to normal position by the spring 262 on the magnet plunger when the magnet is deenergized.

The position of the wheel 253 as shown in Fig. 14 is such that, when the wheel is advanced an angular distance of one tooth, as explained above, there will be no pin 254 in position to engage the insulated lug on the contact spring 54C and therefore neither contact 54C nor 55C will be closed by the operation of the magnet 256. On the next operation of the machine, on which this same channel selection is dialed, the wheel 253 will again be advanced one tooth this time bringing a pin 254 into the path of the lug on the contact spring 54C, this pin 254 being at such a distance from the center of the wheel that contact 54C, adjusted to close on lesser movement than contact 55C, will be closed but contact 55C will not be closed. On the next operation for this same channel selection the wheel 253, when advanced one tooth, brings a different pin 254 into the path of the lug on the contact spring 54C the distance of this pin from the center being such that contacts 54C and 55C will both be closed. As the wheel 253 is advanced in this manner on subsequent operations this same sequence of operations of the contacts 54C and 55C will be repeated, each revolution of the wheel (for six operations of the machine) causing two such cycles.

When neither of the contacts 54C or 55C is closed the channel selection mechanism will not be affected and an article will be delivered from the channel corresponding to the number dialed but on the next operation in which contact 54C is closed a circuit will be closed momentarily near the beginning of the operating cycle from ± through contacts 53C (actuated by lug 251 on drum 240) and 54C to the magnet 228, Figs. 15 and 16, advancing the shelf selector one step so that the article will be delivered from the next channel below the one selected by the dial. The two lugs 251 on the drum 240 are so positioned in operative synchronism with the lug 252 that on an operation in which contacts 54C and 55C are both closed, which is during the time the magnet 256 is energized by the engagement of the contact spring 51C with the lug 252, two momentary circuit closures will be made, one through contacts 53C and 54C and one through contacts 52C and 55C, to the magnet 228 to cause the shelf selector to be advanced two steps, and in this case the article will be delivered from the second channel below the one corresponding to the number dialed. This rotation of the selection of articles from the three shelves will be repeated in this manner on subsequent operations of the machine.

The lugs 251 and 252 on drum 240, Figs. 15 and 28, may be so positioned relative to lugs 239 on the drum 240 that they will operate the associated contacts 51C, 52C and 53C to change the shelf selection as explained above before any of the lugs 239 come into position to close the contact 41C to cause the delivery of merchandise. Otherwise, the shelf rotation feature will be limited to shelves that are delivered from after the contacts 51C, 52C and 53C have operated.

Having thus described my invention what I claim and desire to protect by Letters Patent is:

1. In combination in a coin controlled vending apparatus, a series of article supporting channels each having an article releasing lever, a motor driven common delivery means adapted to mechanically actuate the releasing lever of a selected storage channel to release an article, a cycle control contact device adapted to electrically control the movement and selective operation of said common delivery means, a customer controlled dial switch adapted to create successive electric impulses, mechanism in said common delivery means and in said cycle control device responsive to said impulses to preset both said last mentioned devices to effect delivery of an article from a particular one of said storage channels and a coin controlled device adapted to close a circuit to start said common delivery means when sufficient coins are deposited.

2. In combination in a coin controlled vending apparatus, a plurality of sloping article supporting channels each channel having an article releasing lever, a motor driven common article delivery device which includes a car adapted to be moved past the lower ends of all said supporting channels under control of an electric contactor mechanically synchronized with said car and including also electro-mechanical channel selection mechanism, a customer operated selector adapted to electro-mechanically preset the selection mechanism of said delivery device in preparation for subsequent operation for effecting delivery from a particular channel, a coin controlled device adapted to close a circuit to start said common delivery device when sufficient coins are deposited and means in the delivery device selectively responsive to said preset selection mechanism to actuate the releasing lever of said particular channel to release an article therefrom and to deliver same to a customer.

3. In combination in a coin controlled vending apparatus, a plurality of sloping article supporting shelves each shelf being divided into a series of article supporting channels each channel having an article releasing lever, a motor driven common article delivery device adapted to be moved past the lower ends of all said article supporting channels under control of an electric contactor mechanically synchronized with said delivery device, a customer operated dial switch adapted to create successive electric impulses, means associated with said contactor responsive to a series of said impulses to preset same in preparation for subsequent operation for effecting delivery from a particular shelf and means in said common delivery device responsive to another series of said electric impulses to preset same in preparation for subsequent operation for effecting delivery from a particular channel of said shelf, a coin controlled device adapted to close a circuit to start said common delivery device when sufficient coins are deposited and means in the delivery device selectively responsive to said preset mechanism to actuate the releasing lever of the channel on which the selected article is supported to release an article therefrom and to deliver same to a customer.

4. In combination in a coin controlled vending apparatus, a multiple article delivery unit comprising a plurality of article dispensing channels with individual dispensing elements for articles of various values and a motor driven common article delivery mechanism having triggers adapted to selectively interact with the dispensing elements of a dispensing channel to release an article and deliver said article, magnetic devices for controlling operation of said triggers, a customer operated selector adapted to electrically actuate said magnetic devices to control the selective operation of a trigger for article selection, said selector including a price setter having a presettable price pin for each class of article in said delivery unit and means for moving said price pin into position for operating an associated price control contact simultaneously with the operation of the selector, and a coin controlled device adapted to actuate a contact interconnecting with said price control contact to close a circuit to start said article delivery unit when coins equal in value to said preset price are deposited.

5. In combination in a coin controlled vending apparatus, a multiple article delivery unit comprising a plurality of article dispensing channels with individual dispensing elements and a motor driven common article delivery mechanism having triggers adapted to selectively interact with the dispensing elements of a dispensing channel to release an article and deliver said article, magnetic devices to selectively control the operation of a trigger for article selection, a customer operated selector adapted to electrically actuate said magnetic devices said selector including a price setter having a presettable price pin for each class of article in said delivery unit and means for moving said price pin into position for operating an associated price control contact simultaneously with the operation of the selector, a coin controlled device adapted to actuate a contact interconnecting with said price control contact to close a circuit to start said article delivery unit when coins of sufficient value are deposited and means to restore all operated mechanism in the vending apparatus to normal position.

6. In combination in a coin controlled vending apparatus, a plurality of article supporting channels, means to release an article from any of said supporting channels and to deliver said article to a customer, said releasing means including electro-mechanical devices for presetting same for article selection, an article selector and price setter including presettable price pins and price control contacts said selector being adapted to actuate said electro-mechanical devices in said article releasing means to preset same to effect delivery from a particular one of said storage channels and adapted to simultaneously position a preset price pin for actuating a price control contact corresponding to the price at which a selected article is to be vended, a coin controlled totalizing device having coin actuated switches a contactor adapted to be advanced distances proportional to the value of the coins deposited and means interconnecting said price control contact and said totalizing device to close a circuit to start said delivery means when the evaluated movement of the totalizing device corresponds to the price of the article as preset by the aforesaid positioned price pin.

7. In combination in a coin controlled vending apparatus, a series of article dispensing channels with individual dispensing elements, a motor driven common delivery car adapted to be driven through a cycle of motion past the dispensing ends of said channels, a series of channel selecting triggers on said car such that the momentary displacement of a trigger as the car approaches the position of a dispensing channel will cause the trigger to engage the dispensing elements of the dispensing channel to effect the release of an article therefrom into the car, devices adapted to be positioned to select a particular trigger and the place in the car travel at which said trigger will be displaced, electro-magnets for positioning said devices, a customer operated selector adapted to electrically actuate said electro-magnets for controlling the operation of said triggers for article selection and a coin controlled device adapted to close a circuit to start said common delivery car when sufficient coins are inserted.

8. In combination in a coin controlled vending apparatus, a series of article dispensing channels with individual dispensing elements, a motor driven common delivery car adapted to be driven through a cycle of motion past the dispensing openings of all said channels, electrically presettable means to selectively engage the dispensing elements of any of said channels to effect the discharge of an article therefrom onto said car, a customer controlled dial switch adapted to create successive open and closed intervals in a circuit connecting with said electrically presettable means to preset same in preparation for subsequent operation for effecting the discharge of an article from a particular channel said dial switch having also a control contact adapted to be closed when selection is completed and a coin control device responsive to deposited coins to close a circuit interconnecting with said control contact to complete a circuit to start said common delivery car.

9. In combination in a coin controlled vending apparatus, a motor driven article dispensing mechanism adapted to dispense a variety of articles of various values including electro-mechanical means for selecting the article to be dispensed, a common article selector and price setter unit including a dial switch adapted to electrically actuate mechanism in said dispensing mechanism to preset said mechanism for selection of an article said selector unit including also a presettable price pin for each class of article to be vended and a series of price control contacts and means for moving the price pin corresponding to a selected article into position for operating one of said price control contacts simultaneously with the operation of the selector unit and a coin control unit adapted to close a circuit interconnecting with said price control contact to start said article dispensing mechanism when coins equal in value to the price set up by said price control pin are deposited.

10. In combination in a coin controlled vending apparatus, a motor driven article dispensing mechanism adapted to dispense a variety of articles of various values including electro-mechanical means of selecting the article to be dispensed, a common article selector and price setter unit including a dial switch adapted to electrically actuate mechanism in said dispensing mechanism to preset said mechanism for selection of an article said selector unit including also presettable price control pins for each class of article to be vended and associated price control contacts and means for moving the price control pin corresponding to the selected article into position for operating a price control contact simultaneously with the operation of the selector unit, an electrically operated nickel change delivery mechanism and a coin control unit comprising an electro-mechanical totalizing device adapted to be advanced by the action of coin controlled switches distances proportional to the value of the coins deposited until the totalized value equals the price set up by said price control pin said control unit being adapted to interconnect with said price control contact to start said article dispensing mechanism at this point and to simultaneously transfer the coin totalizing circuit to said nickel change delivery mechanism adapted to dispense nickels change for values inserted in excess of the price of the article.

11. In combination in a coin controlled vending apparatus, a motor driven article dispensing mechanism adapted to dispense a variety of articles including electro-magnetic means of selecting the article to be dispensed, a customer operated dial switch adapted to actuate the electro-magnetic devices in said article dispensing mechanism to preset said mechanism to effect the selection of the particular article to be dispensed by said dispensing mechanism, means to render any further manipulation of said dial switch ineffective after its operation for the selection of an article has been completed until said selector unit and dispensing mechanism have been restored to normal position, means to restore said selector unit and dispensing mechanism to normal position and a coin control mechanism adapted to close a circuit to start said article dispensing mechanism.

12. In combination in a coin controlled vending apparatus, a plurality of sloping article supporting channels each having an article releasing lever, an article delivery car reciprocable adjacent to the lowermost ends of all said channels said car having means to selectively engage the releasing lever of any storage channel to effect the release of an article therefrom, a cycle control contact device adapted to actuate electrical circuits to control the operation of said delivery car and its selective mechanism, a customer operated dial switch adapted to actuate electro-magnetic devices in said delivery car and in said cycle control device to preset both said last mentioned devices for subsequent operative selection of a lever in a particular channel to effect delivery of an article therefrom, and a coin control device adapted to close a circuit to start the delivery mechanism.

13. In combination in a coin controlled vending apparatus, a plurality of article dispensing channels with individual dispensing elements, a motor actuated car reciprocable relatively to the dispensing ends of all said channels, said car containing mechanical elements adapted to selectively engage the dispensing elements of any of said dispensing channels to effect the release of an article therefrom into said car, means for moving a dispensed article in said car toward a point of delivery, a collect switch adapted to be actuated by a dispensed article and a coin control unit adapted to close the motor start circuit when sufficient coins are deposited, said coin control unit having also an electro-magnetic device adapted to be actuated by a circuit closure from said collect switch to effect collection of deposited coins.

14. In combination in a coin controlled vending apparatus, a selective motor driven article dispensing mechanism adapted to dispense a variety of articles of various values including an article controlled switch and a switch to create electric impulses corresponding to the number of pennies change required, a magnetically operated penny change unit adapted to be actuated by impulses from said dispensing mechanism for ejecting pennies change into a receptacle, a coin control unit adapted to close a circuit to start the operation of said dispensing mechanism upon deposit of coins equal to or greater than the value of a selected article, electro-magnetic means in said penny change unit adapted to be actuated by a circuit closure from said article controlled switch to deliver said pennies change from said receptacle to a customer when an article of merchandise is dispensed, and electrical circuits interconnecting said devices.

15. In combination in a coin controlled vending apparatus, a selective multiple article delivery unit having a plurality of sloping article supporting channels with individual article releasing levers said article delivery unit including a motor driven article delivery device having electrically operated positioning devices for article selection together with a series of triggers selectively responsive to said positioning devices adapted to interact with the releasing levers of all said channels to selectively effect the release of an article from any of said channels and deliver said article, an article selector unit adapted to create electric pulses to actuate said electrically operated positioning devices in said multiple article delivery unit to so position the parts of said delivery unit as to effect delivery from a predetermined channel, and electrical circuits interconnecting said devices.

16. In combination in a coin controlled vending apparatus, a selective multiple article delivery unit having a plurality of article dispensing channels for articles of various values including electro-mechanical devices for article selection and a penny change interrupter, a common article selector and price setter unit including price pins and price control contacts said selector being adapted to electro-mechanically actuate mechanism in said delivery unit to preset said mechanism for delivery of a selected article and to simultaneously position preset price pins for actuating price control contacts in the associated price setter in accordance with the price of the article, a penny change delivery device adapted to be actuated by one of a plurality of interrupted electrical circuits in said article delivery unit for delivery of pennies change as determined by a circuit from a price setter contact and a coin control unit adapted to close a circuit to start the operation of said article delivery unit.

17. In combination in a coin controlled vending apparatus, a selective multiple article delivery unit having a plurality of article dispensing channels for articles of various values including presettable electro-mechanical devices, a common article selector and price setter unit adapted to electro-mechanically actuate the presettable devices in said delivery unit to preset said mechanism for delivery of a selected article and to simultaneously position a preset price pin for actuating a price control contact in the associated price setter in accordance with the price of the selected article, a coin control unit comprising coin actuated contacts adapted to cause an electric impulse for each 5¢ value in coins deposited, an electro-magnetic coin totalizing switch responsive to said impulses, and a nickel change delivery device, said coin control unit being adapted to interconnect with said price control contact to close a circuit to start said article delivery unit when the value registered on the totalizing switch is equal to the price of the article and to simultaneously transfer the totalizer actuating circuit to the nickel change delivery device to effect the delivery of a nickel change for each 5¢ unit of value deposited in excess of said price.

18. In combination in a coin controlled vending apparatus, an electrically operated multiple article delivery unit having a plurality of article dispensing channels for articles of various values and a selective delivery mechanism cooperating therewith to effect the release of an article from one of said channels and to deliver said article said mechanism including change control switches, a presettable price control device for predetermining the price at which an article will be delivered, a coin controlled device responsive to deposited coins, a magnetically operated change releasing device, an article selector unit adapted to actuate mechanism in said delivery unit to preset said mechanism for delivery of a selected article and to simultaneously position the mechanism of said price control device in accordance with the preset price, said price control device and said coin control device having contacts that jointly close a circuit to start said article delivery unit, said price control device having also contacts which jointly with one of said change control switches close circuits to actuate said change releasing device and a magnetically operated device adapted to be operated by other of said coin control switches to refund deposited coins and prevent delivery of change in case of failure to deliver merchandise.

19. In combination in a coin controlled vending apparatus, a selective multiple article delivery unit having a plurality of article dispensing channels and a delivery mechanism including a collect switch and a refund switch, an article selector unit adapted to actuate mechanism in said delivery unit to preset said mechanism for delivery of an article from a predetermined channel and a coin control unit including a holder for deposited coins and a holder for change coins said coin control unit having an electro-magnetic collect mechanism adapted to be actuated by said collect switch in the process of article delivery causing deposited coins to be passed into the coin box and change coins to be delivered to the customer and having also an electro-magnetic refund mechanism adapted to be actuated by said refund switch to refund deposited coins when merchandise is not delivered and to pass the change coins from the change holder into the coin box.

20. In combination in a coin controlled vending apparatus, an electrically operated selective multiple article delivery unit having a plurality of article dispensing channels and a delivery mechanism including electro-magnetic article selection mechanism, change control switches and a refund switch, an article selector adapted to electrically actuate the electro-magnetic mechanism in said delivery unit to preset said mechanism for delivery of a selected article, an electro-magnetic change delivery device adapted to be actuated by said change control switches and having a change depleted contact adapted to be actuated when the coins in the change device are less than the maximum required for any transaction, a coin controlled unit adapted to close a circuit to start said delivery mechanism when coins equal to or greater than the price of an article have been deposited, electro-magnetic means adapted to be actuated by said change depleted contact for preventing delivery of merchandise and an electro-magnetic refund device adapted to be actuated by a circuit closure from said refund switch when merchandise is not delivered.

21. In combination in a coin controlled vending apparatus, a plurality of article dispensing channels with individual dispensing elements, a delivery elevator adapted to be moved past the dispensing ends of said channels including movable delivery actuating elements and a cycle control contact device operating in synchronism with said elevator for controlling interconnecting electrical circuits during a cycle of operation, magnetically actuated devices associated with said elevator and said cycle control device adapted to selectively control the movement of said delivery actuating elements to interact with the dispensing elements of said dispensing channels to effect article selection, an article selector unit adapted to control electrical circuits to preset said magnetically actuated devices for article selection and a coin control unit adapted to close a circuit for starting the operation of said apparatus when sufficient coins are inserted.

22. In combination in a multiple article vending machine, a presettable price control device, a coin controlled mechanism comprising a magnetically operated totalizing device adapted to be advanced by circuit closures from coin operated switches distances proportional to the value of the deposited coins, a magnetically operated change device adapted to be actuated by circuit closures from said coin operated switches to release change into a holder for value deposited in excess of a predetermined price, a magnetically operated device adapted to collect deposited coins and deliver change coins from said holder and an electrical control system therefor including a series of relays responsive to a predetermined deposited value of coins as determined by the operation of said totalizing device, an actuating motor started by said relays said control system being adapted to control the cycle of operation of said machine and break the operating circuit on completion of a cycle of operation.

23. In combination in a multiple article vending machine a plurality of article dispensing channels having individual dispensing elements, a motor driven article delivery elevator having magnetically actuated devices adapted to selectively actuate a dispensing element to control selection of an article for delivery, an article selector unit adapted to create electric pulses to preset said magnetically actuated devices for article selection, coin actuated devices, relays operated thereby upon deposit of predetermined amounts, a magnetically operated change releasing device including means to actuate same from said coin actuated devices to deliver change into a holder, a magnetically operated device adapted to collect deposited coins and deliver change coins from said holder upon delivery of an article and an electrical contact device for controlling the cycle of operation of the machine and breaking the operating circuit on completion of a cycle of operation.

EDWARD G. WEILER.